(12) United States Patent
Kobori et al.

(10) Patent No.: US 8,164,316 B2
(45) Date of Patent: Apr. 24, 2012

(54) DC/DC CONVERTER

(75) Inventors: Yasunori Kobori, Gunma (JP); Tetsuya Furuya, Gunma (JP); Haruo Kobayashi, Gunma (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 691 days.

(21) Appl. No.: 12/306,612

(22) PCT Filed: Jun. 11, 2007

(86) PCT No.: PCT/JP2007/061737
§ 371 (c)(1),
(2), (4) Date: Dec. 24, 2008

(87) PCT Pub. No.: WO2008/001603
PCT Pub. Date: Jan. 3, 2008

(65) Prior Publication Data
US 2009/0201003 A1 Aug. 13, 2009

(30) Foreign Application Priority Data

Jun. 26, 2006 (JP) .................................. 2006-175408
Nov. 9, 2006 (JP) .................................. 2006-304320

(51) Int. Cl.
*G05F 1/40* (2006.01)
(52) U.S. Cl. ....................................................... 323/282
(58) Field of Classification Search .................. 323/222, 323/224, 225, 259, 266, 271, 282, 284–285, 323/344, 351
See application file for complete search history.

(56) References Cited

U.S. PATENT DOCUMENTS
4,368,409 A * 1/1983 Sivanesan et al. ............ 315/411
(Continued)

FOREIGN PATENT DOCUMENTS
| JP | 58-40913 | 9/1983 |
|----|----------|--------|
| JP | 11-266579 | 9/1999 |
| JP | 2002-233139 | 8/2002 |
| JP | 2005-45943 | 2/2005 |

OTHER PUBLICATIONS

"Increase Capacity by 30% by Modifying Negative Electrode as well Sony Developed New Type Li-ION Battery Sn-Based Material is Amorphized and Applied", Nikkei Electronics, Feb. 28, 2005, pp. 34-35 (with English Abstract and computer-generated English translation).

(Continued)

*Primary Examiner* — Adolf Berhane
(74) *Attorney, Agent, or Firm* — Oblon, Spivak, McClelland, Maier & Neustadt, L.L.P.

(57) ABSTRACT

A conventional DC/DC converter with both a step-up function and a step-down function has a drawback that its output voltage will be discontinuous when its operations are switched. An error signal, which is representative of a difference between a target voltage and a present voltage, is inputted to both a step-down switching control circuit and a step-up switching control circuit. When the difference between the target voltage and the present voltage is below a predetermined value, the switching of the step-down and step-up converters by the step-down and step-up switching control circuits, respectively, are caused to concurrently run in a time division manner.

4 Claims, 21 Drawing Sheets

U.S. PATENT DOCUMENTS

| | | | | |
|---|---|---|---|---|
| 5,406,471 | A | * | 4/1995 | Yamanaka ..................... 363/124 |
| 5,627,459 | A | * | 5/1997 | Itoyama et al. ................ 323/283 |
| 6,166,527 | A | * | 12/2000 | Dwelley et al. ................ 323/222 |
| 7,199,563 | B2 | * | 4/2007 | Ikezawa ......................... 323/266 |
| 7,205,750 | B2 | * | 4/2007 | Murakami ..................... 323/267 |
| 7,737,668 | B2 | * | 6/2010 | Oswald et al. ................. 323/259 |
| 7,768,214 | B2 | * | 8/2010 | Doi et al. ....................... 315/291 |

OTHER PUBLICATIONS

Yasuhide Imamura, et al., "Characteristics of DC-DC Converter Using Delta-Sigma Modulation Control", Technical Report of IEICE, EE2002-78, pp. 84-94 (with English Abstract and computer-generated English translation).

* cited by examiner

DC/DC CONVERTER

TECHNICAL FIELD

The present invention relates to a DC/DC converter.

More particularly, the present invention relates to a DC/DC converter which performs both step-down control and step-up control, which can constantly guarantee a predetermined output voltage against gradual drop of an input voltage, and which has low voltage conversion loss.

BACKGROUND ART

Mobile electronic devices such as cell-phone, portable audio player and like are widely used currently. Lithium-ion secondary batteries are widely used for such mobile electronic devices.

When function of the mobile electronic devices increases, power consumption of the mobile electronic devices increases too, and therefore it is desired to prolong service life of the batteries.

To meet such a requirement of the market, a new type lithium-ion secondary battery is brought to the market (see Non-Patent Document 1), which is developed based on a conventional lithium-ion secondary battery. Compared to the conventional lithium-ion battery, the current capacity of the new type battery is increased by 30%.

FIG. 21 is a graph showing the discharging characteristic of the new type battery. The new type battery has large discharged capacity and long service life compared with the conventional battery. Further, the discharge voltage possible to be stably outputted by the new type battery is expanded to around 2V.

Although the conventional lithium-ion battery has high discharge voltage, since the voltage drops rapidly as the discharge voltage becomes 3V or lower (see E1 of FIG. 21), the discharge cutoff voltage is set to 3V so as to prevent over discharge. In such a case, since the output voltage is 2.5V, the battery only needs to be provided with a DC/DC converter having a power circuit which performs step-down control only.

In contrast, in order to make better use of the new type lithium-ion secondary battery, an input voltage down to around 2.0V (which is lower than the output voltage) also needs to be coped with. In other words, in addition to the step-down control, the DC/DC converter also needs to perform step-up control, and further, it is necessary to continuously and smoothly perform switching control between the step-down control and the step-up control so as to output a voltage of 2.5V (which is the output voltage corresponding to the load using the conventional battery) can be outputted.

[Patent Document 1] Japanese Unexamined Patent Application Publication No. 2002-233139

[Patent Document 2] Japanese published examined application No. 58-40913.

[Non-Patent Document 1] "Changing negative-electrode increases capacity by 30%" - - - Sony's new type lithium-ion secondary battery", Nikkei Electronics, p. 34-35, Feb. 28, 2005

[Non-Patent Document 2] "About Characteristic of DC-DC Converter Controlled by Delta-Sigma Modulation", IMAMURA Yasuhide, TANAKA Tetsurou YOSHIDA Hiroshi, Technical report of IEICE, EE2002-78

DISCLOSURE OF THE INVENTION

There are many conventional DC/DC converters which perform both the step-up control and the step-down control, however performance of these DC/DC converters does not adequately meet the requirement of the mobile electronic devices.

As an example, Patent Document 1 discloses a configuration in which a step-down converter is connected in series with a step-up control, the step-down converter following the step-up control. As can be easily known from the document, such a configuration includes a lot of components such as coils and capacitors. Since the voltage conversion losses of the DC/DC converter caused by such components are connected in tandem, the voltage conversion efficiency becomes worse. Further, in the circuit disclosed in Patent Document 1, since the voltage is stepped up by the step-up DC/DC converter to almost twice as high as the input voltage and then stepped down by the step-down DC/DC converter, there is unnecessary step-up/step-down operation.

In view of the aforesaid problems, it is an object of the present invention to provide a DC/DC converter which can constantly guarantee a predetermined output voltage against gradual drop of the input voltage, and which has low voltage conversion loss.

A DC/DC converter according to an aspect of the present invention has a circuit which includes a step-down control switch, a first diode, a coil, a step-up control switch, a second diode and a capacitor. An error signal generating section takes the difference between the voltage of the circuit and a target voltage and outputs an error signal.

Upon receiving the error signal, the step-down switching control section controls the step-down control switch.

Upon receiving the error signal, the step-up switching control section controls the step-up control switch.

As the input voltage gradually drops, the voltage difference between the input voltage and the voltage desired to be outputted becomes smaller and smaller. In other words, the voltage difference needs to be subjected to a step-down control becomes smaller and smaller. However, there is a limit on the duty ratio possible to be used to perform switching control with the step-down control switch and the step-up control switch. When switching the control operation from the step-down control to the step-up control at the time when the difference between the input voltage and the output voltage is almost zero, the output voltage will become discontinuous due to the limit on the duty ratio of the switching operation. To solve such a problem, both the step-down control and the step-up control are performed slightly in an alternate manner when the voltage falls within an uncontrollable voltage range where the voltage control can not be performed only by step-down control or only by step-up control. Namely, an operation of performing step-up control to compensate for excessive voltage drop caused by the step-down control is rapidly performed.

According to the present invention, it is possible to provide a DC/DC converter which can constantly guarantee a predetermined output voltage against gradual drop of the voltage between the terminals of the secondary battery, and which has low voltage conversion loss.

BEST MODES FOR CARRYING OUT THE INVENTION

Embodiments of the present invention will be described below with reference to FIGS. 1 to 21.

Figure 1:
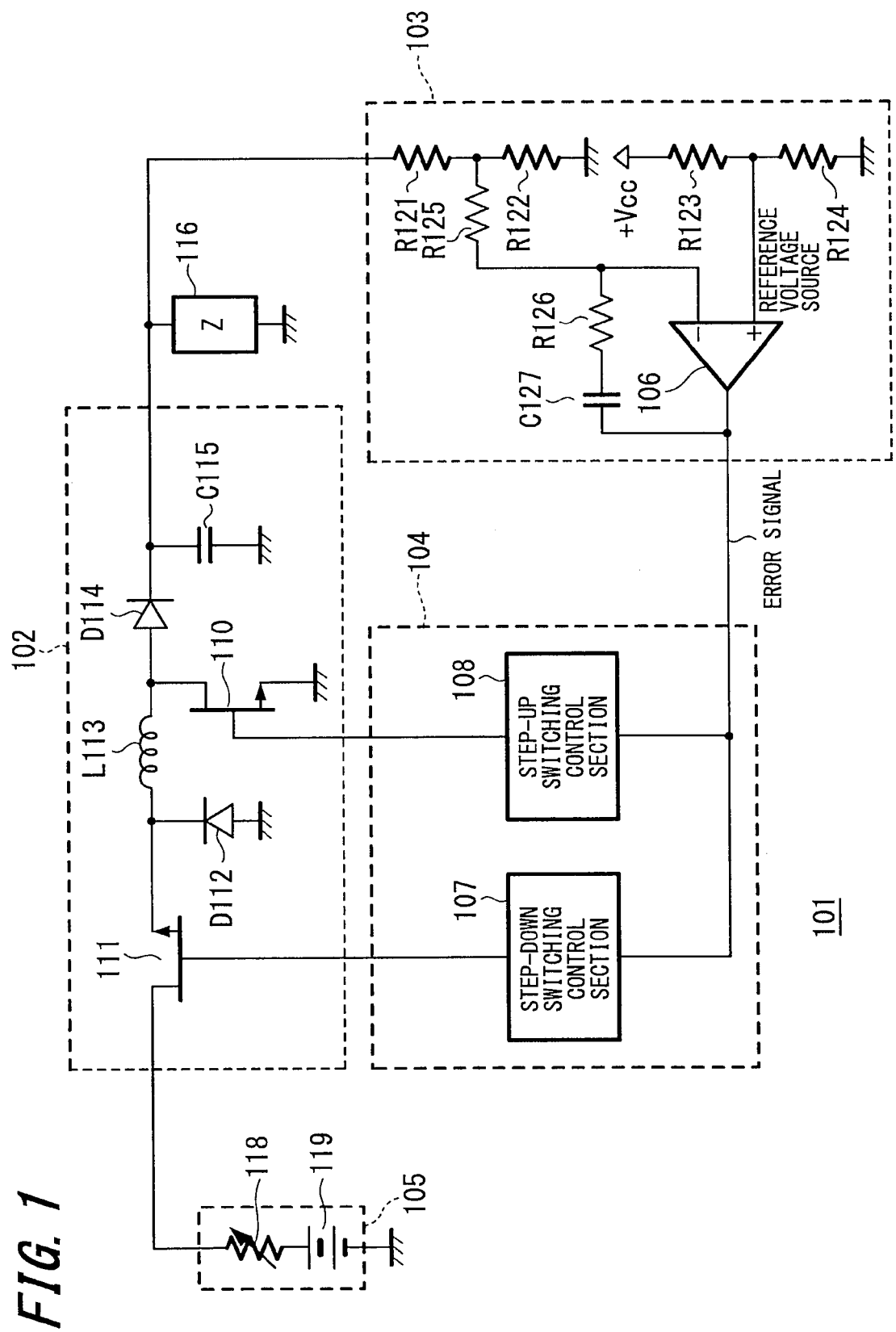
FIG. 1 is a block diagram showing a common technical idea shared by a first embodiment and a second embodiment.

FIG. 1 is a block diagram showing a common technical idea shared by a first embodiment and a second embodiment, which are to be described later.

The aforesaid block diagram is a mixed type circuit diagram formed by circuit elements and blocks showing function.

A DC/DC converter 101 can be divided into a converter circuit section 102, an error signal generating section 103 and a step-up/step-down control section 104. Both the first embodiment and the second embodiment, which are to be described later, mainly relate to the step-up/step-down control section 104.

The converter circuit section 102 converts the voltage of a battery 105 (i.e., input voltage) into a predetermined voltage (i.e., an output voltage).

The battery 105 is a known battery. The battery 105 can be a primary battery or a secondary battery. The battery 105 is equivalently described as a voltage source 119 and an internal resistance 118. Namely, the internal resistance 118 increases as the battery is consumed.

The error signal generating section 103 is formed by a differential amplifier mainly configured by resistors R125 and R126, a capacitor C127 and an operational amplifier 106. The output voltage outputted from the converter circuit section 102 is divided by resistors R121 and R122, the divided voltage is compared with a reference voltage obtained from resistors R123 and R124, and a signal representing the difference is outputted. Such a signal, i.e., the signal outputted by the operational amplifier 106 serves as a control signal (referred to as "error signal" hereinafter) for feedback controlling the step-up/step-down control section 104.

The step-up/step-down control section 104 includes a step-down switching control section 107 and a step-up switching control section 108.

Upon receiving the error signal, the step-down switching control section 107 outputs a control signal which is a pulse voltage. Such a signal is applied to the gate of a first FET 111 to control the ON/OFF operation of the first FET 111.

Upon receiving the error signal, the step-up switching control section 108 outputs a control signal which is a pulse voltage. Such a signal is applied to the gate of a second FET 110 to control the ON/OFF operation of the second FET 110.

The voltage of the battery 105 is dropped according to duty ratio of the ON/OFF control of the first FET 111.

The voltage of the battery 105 is raised according to duty ratio of the ON/OFF control of the second FET 110.

The internal resistance 118 of the battery 105 increases as battery 105 is used and therefore consumed. As a result, the voltage between the terminals of the battery 105 drops.

In the prior arts, since the operation of step-down control and the operation of step-up control are temporally-separated, when the voltage control is shifted from the step-down control to the step-up control, the output voltage of the DC/DC converter becomes discontinuous.

In the present embodiments, when the voltage control is shifted from the step-down control to the step-up control, there is a period while the step-down control and the step-up control are concurrently performed.

First Embodiment

Figure 2:
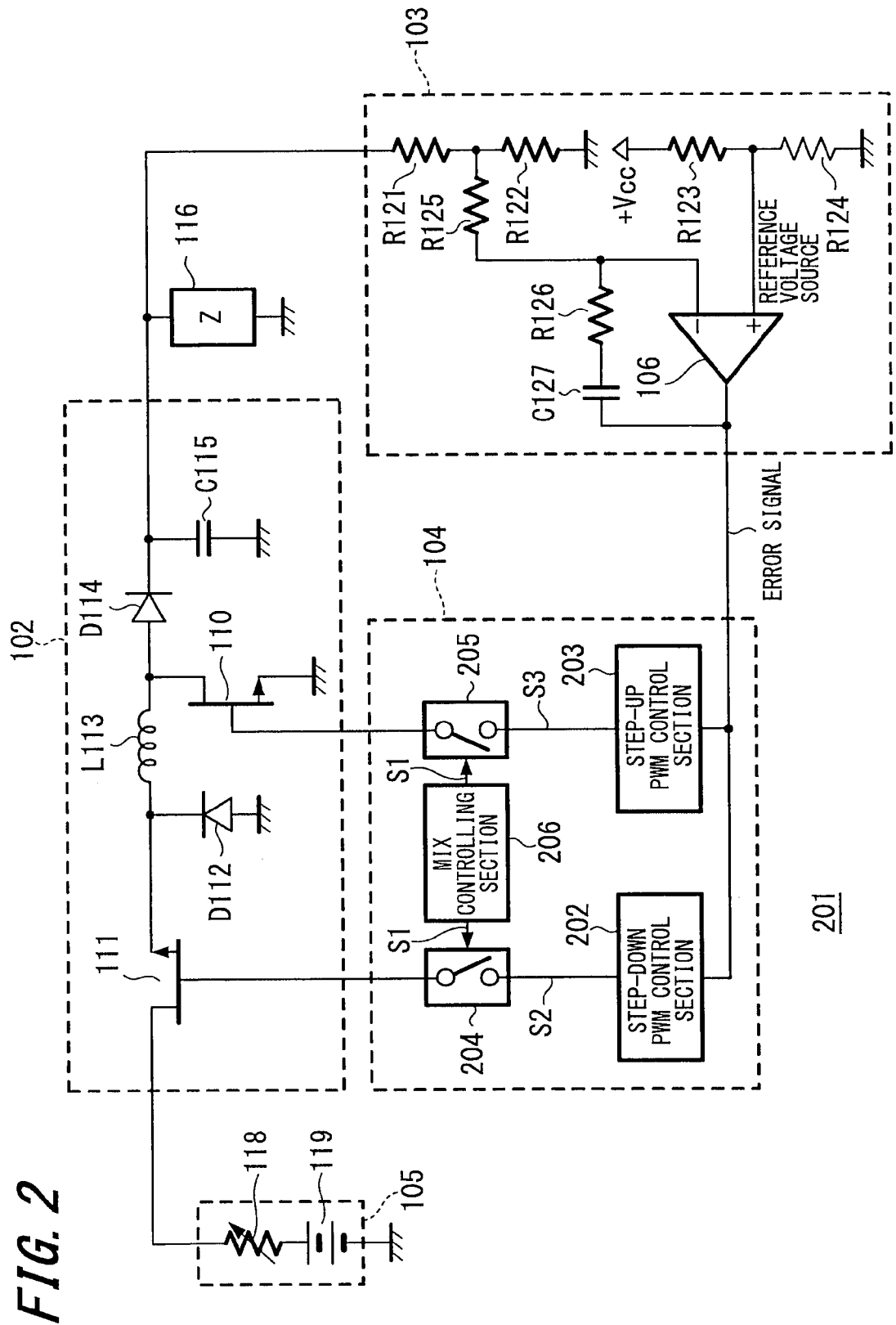
FIG. 2 is a block diagram showing a DC/DC converter according to the first embodiment of the present invention.

FIG. 2 is a block diagram showing a DC/DC converter as an example of the first embodiment of the present invention.

The aforesaid block diagram is a mixed type circuit diagram constituted by circuit elements and blocks showing function.

A DC/DC converter 201 can be divided into a converter circuit section 102, an error signal generating section 103 and a step-up/step-down control section 104.

A battery 105 is a known battery. The battery 105 can be a primary battery or a secondary battery.

The converter circuit section 102 is a circuit in which a step-down converter and a step-up converter operate in combination, and is known from patent document 2 and the like. The details about the step-down converter and the step-up converter are known from Non-Patent Document 1, Non-Patent Document 2 and the like.

A first FET 111, also called a "step-down control switch", is a switch for performing control to drop the voltage in the converter circuit section 102. Dropping range of the output voltage can be controlled by changing the duty ratio of the ON/OFF operation of the first FET 111.

A first diode D112 is adapted to form a current path including a subsequent coil L113 during the OFF period of the first FET 111.

The coil L113 is a known inductance element. The coil L113, together with a subsequent capacitor C115, forms a LC filter to smooth a rectangular wave current, and plays an important role both as an element for bringing about electricity storage function of the step-down converter and as an element for bringing about electricity storage function of the step-up converter, wherein the step-down converter is configured by the first FET 111, the first diode D112 and the subsequent capacitor C115, and the step-up converter is configured by a subsequent second FET 110, a subsequent second diode D114 and the subsequent capacitor C115.

The second FET 110 (also called a "step-up control switch") is a switch for performing control to raise the voltage in the converter circuit section 102. Raising range of the output voltage can be controlled by changing the duty ratio of the ON/OFF operation of the second FET 110.

The second diode D114 is adapted to prevent the current generated by the capacitor C115 from flowing into the second FET 110 during the "ON" period of the second FET 110.

As described above, the capacitor C115 forms the LC filter, and plays an important role as an element for bringing about electricity storage function.

The output of the DC/DC converter 201 is supplied to a load 116.

A step-down PWM control section 202 provides a step-down control signal S2 so as to control the ON/OFF operation of the first FET 111. If the duty ratio of the ON/OFF period changes, the voltage of the step-down control changes too.

A step-up PWM control section 203 provides a step-up control signal S3 so as to control the ON/OFF operation of the second FET 110. If the duty ratio of the ON/OFF period changes, the voltage of the step-up control changes.

A step-down PWM control switch 204 is a switch for selecting to pass or cut off the step-down control signal generated by the step-down PWM control section 202 to the first FET 111.

A step-up PWM control switch 205 is a switch for selecting to pass or cut off the step-up control signal generated by the step-up PWM control section 203 to the second FET 110.

A MIX controlling section 206 is adapted to perform a function which is a central role of the present invention, specifically, is adapted to exclusively control the ON/OFF operation of both the step-down PWM control switch 204 and the step-up PWM control switch 205. Under the control of the MIX controlling section 206, the step-down PWM control operation and the step-up PWM control operation are alternately performed. The details about the control operation performed by the MIX controlling section 206 (referred to as "MIX control" hereinafter) will be described later.

Figure 3:
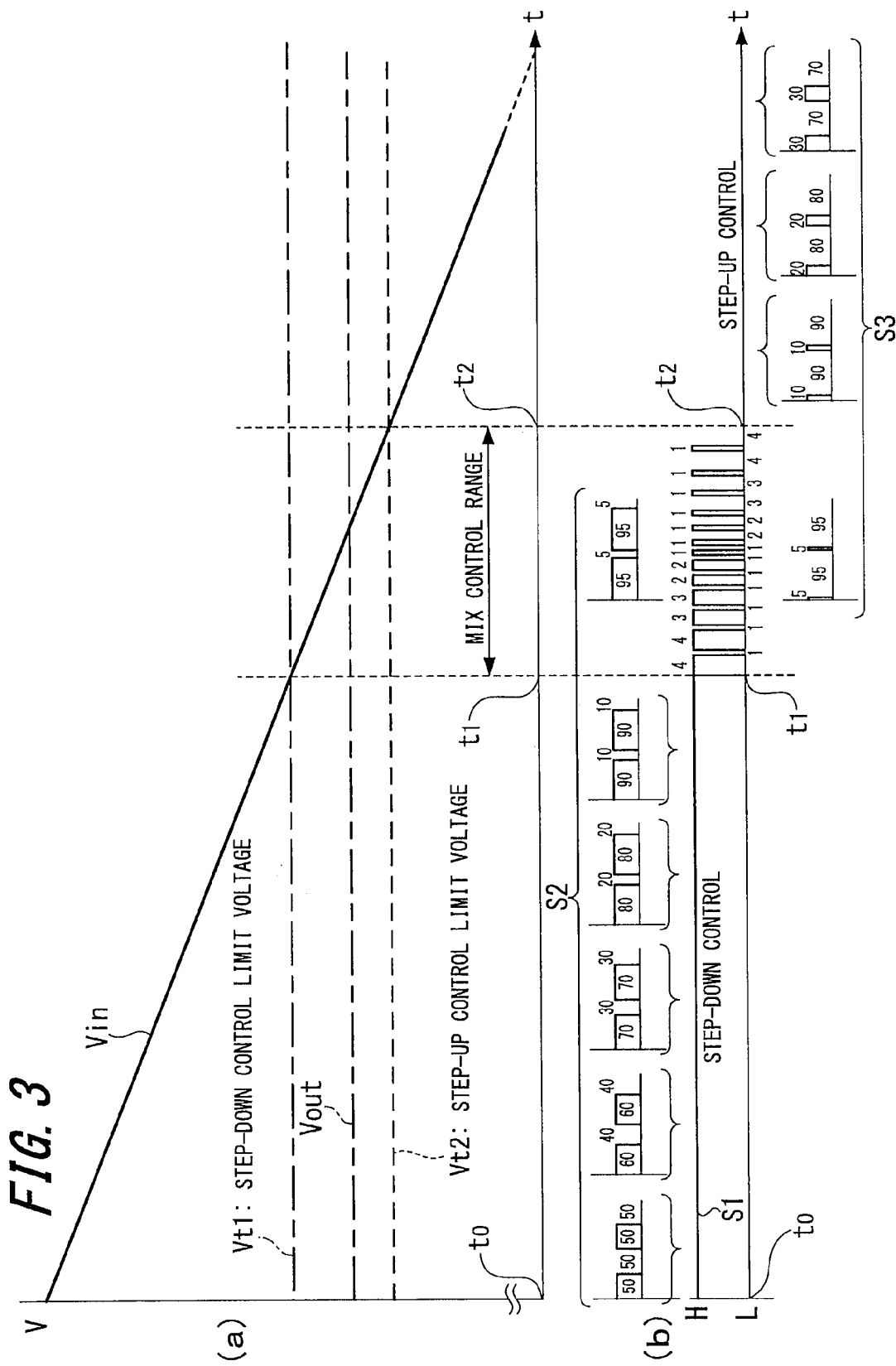
FIG. 3 is a graph explaining the operation of the DC/DC converter according to the first embodiment of the present invention.

FIGS. 3(*a*) and (*b*) are graphs explaining operation of the DC/DC converter 201 shown in FIG. 2.

FIG. 3(*a*) shows the voltage change of the battery 105 with respect to the time axis. In order to facilitate the description, it is supposed that the voltage change of the battery 105 and the time axis are in linear relationship, although they are usually in nonlinear relationship. A voltage Vin shown in FIG. 3(*a*) is the voltage between the terminals of the battery 105, and it can be known from FIG. 3(*a*) that the internal resistance increases as the battery 105 is consumed, and therefore the voltage between the terminals of the battery 105 drops.

FIG. 3(*b*), which has the same time axis shown in FIG. 3(*a*), explains the step-down control and the step-up control. Herein, state S1 represents the state of the ON/OFF operations of the step-down PWM control switch 204 and the step-up PWM control switch 205. Namely, FIG. 3(*b*) shows a waveform of the step-down control signal S2 generated by the step-down PWM control section 202 and a waveform of the step-up control signal S3 generated by the step-up PWM control section 203 in a manner in which the time axis in enlarged.

As shown in FIG. 3(*b*), when state S1 is "H", i.e., during a period until the voltage Vin has dropped to a step-down control limit voltage Vt1 (a period from time t0 to time t1), the step-down PWM control switch 204 is turned "ON", and the step-up PWM control switch 205 is turned "OFF". The step-down PWM control is performed in such a period.

In the period while the step-down PWM control is performed, a control signal is supplied from the MIX controlling section 206 to the step-down PWM control switch 204, and the step-down PWM control switch 204 is in "ON" state. Further, the step-down control signal S2 (see FIG. 2) from the step-down PWM control section 202 is supplied to the first FET 111 of the converter circuit section 102 through the step-down PWM control switch 204. Further, the switching control of the first FET 111 is performed according to the duty ratio of the step-down control signal S2.

Herein, as shown in FIG. 2(*b*), the duty ratio of the step-down control signal S2 is 50% at first for example, and the duty ratio gradually changes. In other words, the first FET 111 is controlled so that the duration of "ON" state thereof becomes longer and longer as the voltage Vin becomes low.

Next, when state S1 is "L", i.e., during a period after the voltage Vin has dropped to a step-up control limit voltage Vt2 (a period after time t2), the step-down PWM control switch 204 is turned "OFF", and the step-up PWM control switch 205 is turned "ON". In such a period, the step-up PWM control is performed.

If the above operations are described with reference to FIG. 2, then it can be described that, in the period after time t2, a control signal is supplied from the MIX controlling section 206 to the step-up PWM control switch 205, and the step-up PWM control switch 205 is in "ON" state. Further, the step-up control signal S3 (see FIG. 2) from the step-up PWM control section 203 is supplied to the second FET 110 of the converter circuit section 102 through the step-up PWM control switch 205. In such a state, the step-down PWM control switch 204 is in "OFF" state. Further, the switching control of the second FET 110 is performed according to the duty ratio of the step-up control signal S3.

Herein, as shown in FIG. 2(*b*), the duty ratio of the step-up control signal S3 is a small value of 5% at first for example, and the duty ratio gradually increases. In other words, the second FET 110 is controlled so that the duration of "ON" state thereof becomes longer and longer as the voltage Vin becomes low.

Next, the MIX control, which is most important part in the embodiments of the present invention, will be described below. The MIX control period (a period from time t1 to time t2) is a period while the step-down control and the step-up control are performed in a mixed manner.

In other words, in the MIX controlling section 206 (see FIG. 2), the MIX control starts at the time when the voltage Vin reaches the step-down control limit voltage Vt1. During the MIX control period, the duty ratio of the step-down control signal S2 generated by the step-down PWM control section 202 is fixed to 95:5, which is a maximum value; and the duty ratio of the step-up control signal S3 generated by the step-up PWM control section 203 is fixed to 5:95, which is a minimum value.

Further, in the vicinity of time t1, the MIX control is performed in a ratio of 4 (step-down control) to 1 (step-up control), and the ratio is gradually reversed as the time approaches time t2. Namely, as the time progresses from time t1 to time t2, the step-down control period reduces gradually in the order of "4:1", "3:1", "2:1", "1:1", and conversely the step-up control period increases gradually in the order of "1:1", "2:1", "3:1", "4:1". When the MIX control is terminated, the control operation is shifted to the step-up PWM control performed by the step-up PWM control section 203.

Incidentally, at the time when the duty ratio of the step-down control signal S2 generated by the step-down PWM control section 202 is fixed to the maximum value of 95:5, the minimum step-down control is performed.

Similarly, at the time when the duty ratio of the step-up control signal S3 generated by the step-up PWM control section 203 is fixed to the minimum value of 5:95, the minimum step-up control is performed.

FIG. 4(a), (b) and (c) are time charts of the control signals during the MIX control period (the period from time t1 to time t2) as shown in FIG. 3.

FIG. 4(a) is a time chart showing the voltage change of the step-down control signal S2 generated by step-down PWM control section 202 with respect to the time axis when the step-down control signal is applied to the gate of the first FET 111 through the step-down PWM control switch 204.

FIG. 4(b) is a time chart showing change of state S1 with respect to the time axis, which is the same as that of FIG. 4(a).

FIG. 4(c) is a time chart showing the voltage change of the step-up control signal S3 generated by step-up PWM control section 203 with respect to the time axis, which is the same as those of FIGS. 4(a) and (b), when the step-up control signal is applied to the gate of the second FET 110 through the step-up PWM control switch 205.

In FIG. 4(a), the step-down control signal S2 is a control signal applied to the first FET 111, and corresponds to "ON" state in "H" state.

In FIG. 4(c), the step-up control signal S3 is a control signal applied to the second FET 110, and corresponds to "ON" state in "H" state.

In FIG. 4(c), when state S1 is "H", the step-down PWM control switch 204 is turned "ON", and the step-up PWM control switch 205 is turned "OFF".

Conversely, when state S1 is "L", the step-up PWM control switch 205 is turned "ON", and the step-down PWM control switch 204 is turned "OFF".

In order to facilitate the description, the value of the duty ratio is indicated in the time charts of FIG. 4(a), (b) and (c).

The step-down control signal S2 is a control signal having a duty ratio of 95:5 when state S1 is "H". The step-down control signal S2 is in "OFF" state when state S1 is "L", and therefore has a duty ratio of 100:0. At this time, the first FET 111 is in "ON" state constantly.

The step-up control signal S3 is a control signal having a duty ratio of 5:95 when state S1 is "L". The step-up control signal S3 is in "OFF" state when state S1 is "H", and therefore has a duty ratio of 0:100. At this time, the second FET 110 is in "OFF" state constantly.

Figure 4:
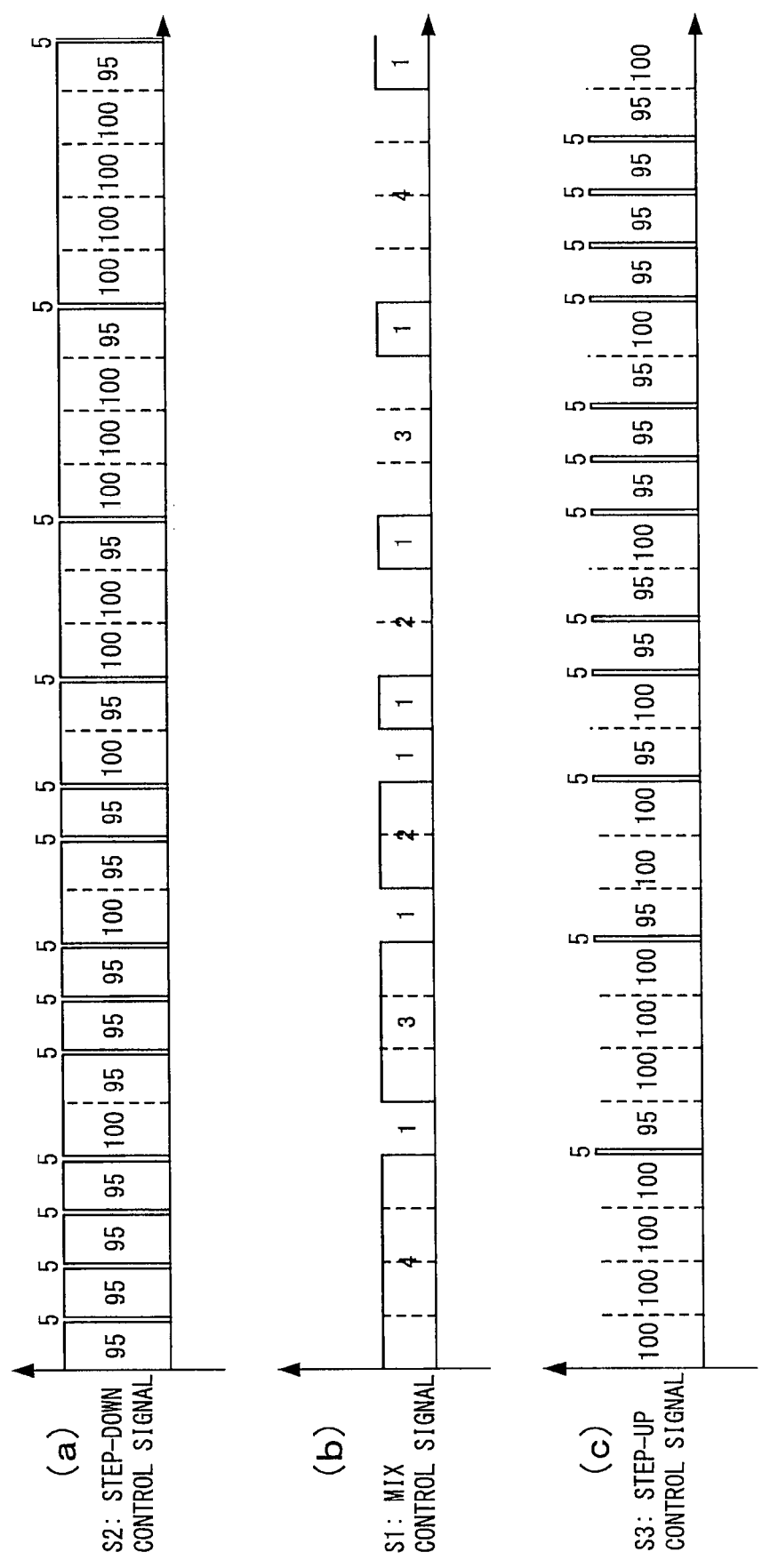
FIG. 4 is a time chart of control signals during a MIX control period.

As can be known from FIG. 4, state S1 changes ratio of step-down control switching to step-up control switching as the voltage Vin drops.

The above description can be summarized below.

As the voltage of the battery 105 gradually drops, the voltage difference between the voltage of the battery 105 and the voltage desired to be outputted becomes smaller and smaller. In other words, the voltage difference needs to be subjected to a step-down control becomes smaller and smaller.

On the other hand, however, there is a limit on the duty ratio possible to be used to perform control with the switching elements.

When the time width of the switching pulses becomes very small, the edges of pulses will become dull and therefore collapse due to the stray capacity of the circuit elements and circuit wirings. As a result, the switching operation can not be performed and therefore the "OFF" period will be eliminated. If the "OFF" period is eliminated, since excessive current will flow into the coil and the capacitor, there is a concern that the circuit might be broken in the worst case. For this reason, it is necessary to set a lower limit on pulse width.

Thus, there arises a problem that, when switching the control operation from the step-down control to the step-up control at the time when the difference between the input voltage and the output voltage is almost zero, the output voltage will become discontinuous due to the limit on the duty ratio of the PWM switching operation.

The MIX control according to the present embodiment is adapted to slightly perform both the step-down control and the step-up control in an alternate manner when the voltage falls within a voltage range where the voltage control can not be performed only by step-down control or only step-up control (such a voltage range is referred to as "uncontrollable voltage range" hereinafter).

According to the present embodiment, by rapidly performing step-up control to compensate for excessive voltage drop caused by the step-down control, slight step-down/step-up control can be smoothly performed.

Herein, the "uncontrollable voltage range" is uniquely decided by both the maximum/minimum duty ratio possible for performing PWM control, which is defined for the aforesaid reason (for example, in FIG. 2, the maximum duty ratio of 95:5 is used in the step-down control and minimum duty ratio of 5:95 is used in the step-up control), and the DC resistance of the circuit elements configuring the converter circuit section 102 (i.e., the power conversion efficiency of the converter circuit section 102). The minimum pulse width of the PWM control is determined by the circuit designer so that the pulse is not eliminated.

For example, if the maximum duty ratio possible for performing step-down PWM control is 95:5, the relationship between the input voltage and the output voltage can be expressed by equation (1).

[Equation 1]

$$Vin \times 0.95 = Vout \quad (1)$$

Thus, the input voltage impossible to be controlled by the step-down control can be calculated by equation (2).

[Equation 2]

$$Vin = \frac{Vout}{0.95} \cong 1.0526 Vout \quad (2)$$

However, with the above equations, the result is calculated without considering the voltage drop caused by the DC resistance of the circuit elements configuring the converter circuit section 102. Thus, the loss caused by the combined resistance of the first FET 111, the second FET 110, the coil L113, the capacitor C115, the first diode D112, the second diode D114 and the like has to be taken into consideration.

The operation of the step-down converter and the step-up converter configuring the converter circuit section 102 of the present embodiment will be described below.

FIGS. 5(a) and (b) are circuit diagrams of the step-down converter and the step-up converter configuring the converter circuit section 102 of the present embodiment. FIG. 5(a) is the circuit diagram of the step-down converter; and FIG. 5(b) is the circuit diagram of the step-up converter.

First, circuit operation of the step-down converter will be described below with reference to FIG. 5(a).

In FIG. 5(a), a switch SW1 corresponds to the first FET 111 of FIG. 2.

In FIG. 5(a), a diode D1 corresponds to the first diode D112 of FIG. 2.

In FIG. 5(a), a coil L and a capacitor C respectively correspond to the coil L113 and the capacitor C115 of FIG. 2.

In FIG. 5(a), when the switch SW1 is turned on, the electric power from the power supply Vin is supplied to the capacitor C and a load R through the coil L. In other words, a current Ion flows into a parallel circuit of the capacitor C and the load R through the coil L. At this time, electrical energy is stored in the coil L and the capacitor C.

When the switch SW1 is turned off, the current in the coil L will try to flow continuously according to Lenz's law, so that the stored electrical energy will be released. Thus, the electrical energy stored in the coil L flows through the load R and the diode D1. In other words, the diode D1 is indispensable for forming a current path Ioff when the switch SW1 is turned off. At this time, the electrical energy stored in the capacitor C is also supplied to the load R.

When the switch SW1 is turned on again, the electric power from the power supply Vin is supplied to each of the circuit elements through the switch SW1, so that a current Ion is formed. Such an electric power is supplied to the load R, however a part of the electric power is stored in the coil L and capacitor C.

By the aforesaid switching operation of the switch SW1, the voltage of the electric power Vin is converted into a voltage Vout applied to the load R according to equation (3).

[Equation 3]

$$Vout = \frac{Ton}{Ton + Toff} Vin = \frac{Ton}{T} Vin \quad (3)$$

Where Ton represents "ON" period of the switch SW, Toff represents "OFF" period of the switch SW, and T=Ton+Toff.

In other words, the shorter the "ON" period of the switch SW1 is, the lower the input voltage is dropped to.

Next, circuit operation of the step-up converter will be described below with reference to FIG. 5(b).

In FIG. 5(a), a switch SW2 corresponds to the second FET 110 of FIG. 2.

In FIG. 5(a), a diode D1 corresponds to the second diode D114 of FIG. 2.

In FIG. 5(a), a coil L and a capacitor C respectively correspond to the coil L113 and the capacitor C115 of FIG. 2.

In FIG. 5(b), when the switch SW2 is turned on, the electric power from the power supply Vin is stored in the coil L. In other words, a current Ion flows in a direction indicated by the dotted line.

Next, when the switch SW2 is turned off, the current will try to flow continuously according to Lenz's law, so that the stored electrical energy will be released. At this time, the electrical energy stored in the coil L and the electric power from the power supply Vin are supplied to the load R through the diode D2. In other words, a current Ioff flows into a parallel circuit of the load R and the capacitor C through the diode D2. At this time, the electrical energy is stored in the capacitor C.

When the switch SW1 is turned on again, the current Ion generated by the electric power Vin flows through the coil L, so that the electrical energy is stored in the coil L. On the other hand, a current Ion' caused by the electrical energy stored in the capacitor C flows through the load R. At this time, since the diode D2 prevents reverse current from flowing therein, the electrical energy stored in the capacitor C does not flow into the switch SW2. The current Ion' from the capacitor C flows into the load R only.

By the aforesaid switching operation of the switch SW2, the voltage of the electric power Vin is converted into a voltage Vout applied to the load R according to equation (3).

[Equation 4]

$$Vout = \frac{Ton + Toff}{Toff} Vin = \frac{T}{Toff} Vin \quad (4)$$

Where Ton represents "ON" period of the switch SW, Toff represents "OFF" period of the switch SW, and T=Ton+Toff.

In other words, the longer the "ON" period of the switch SW2 is, the higher the input voltage is raised to.

Figure 6:
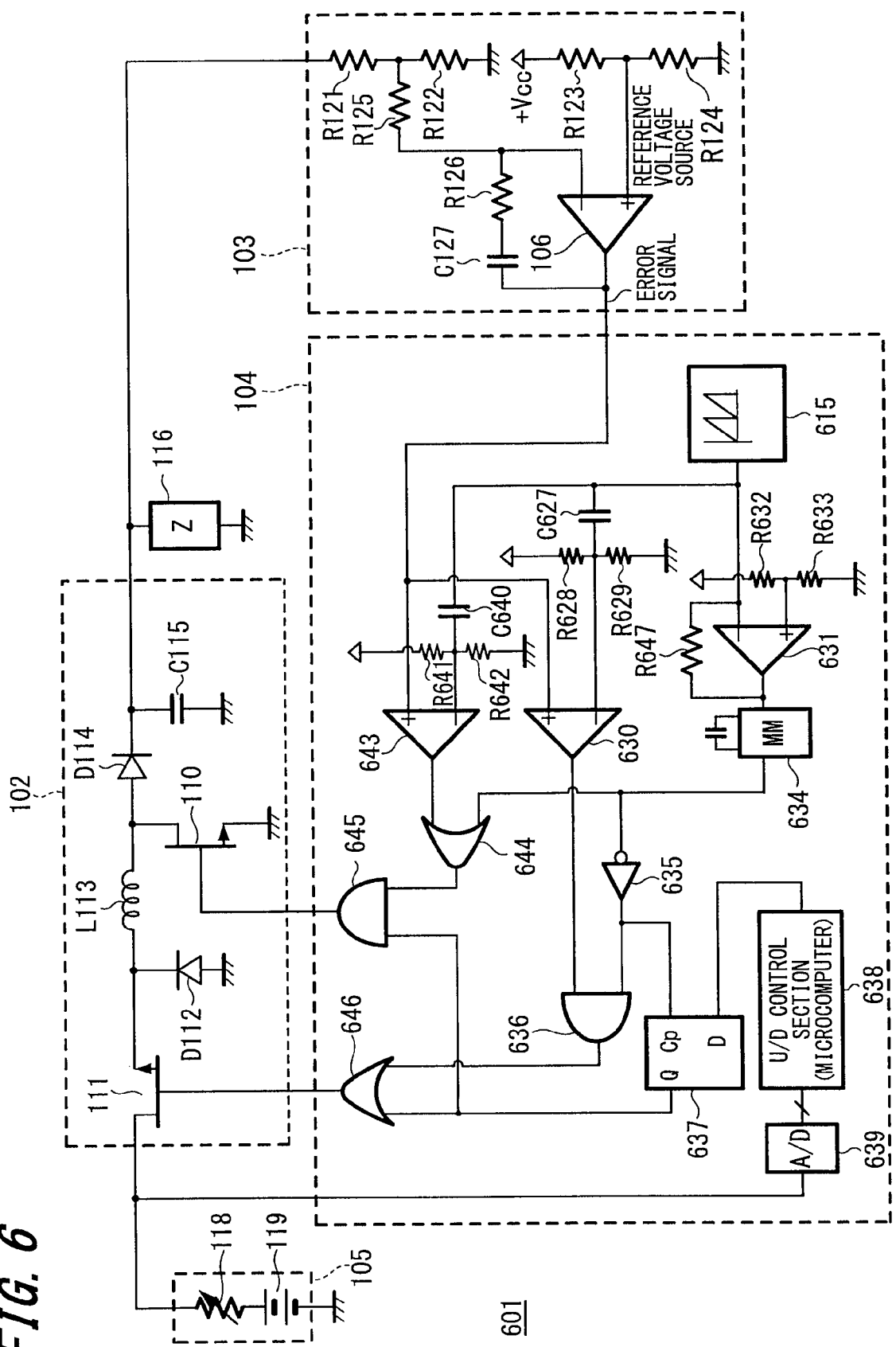
FIG. 6 is an example of a circuit diagram of the DC/DC converter according to the first embodiment of the present invention.

FIG. 6 is a circuit diagram of the DC/DC converter according to the first embodiment of the present invention. FIG. 6 shows an example of FIG. 2, in which a concrete circuit of the step-up/step-down control section 104 is provided. Incidentally, in FIG. 6, the internal structures of the converter circuit section 102, the error signal generating section 103 and the battery 105 are the same as those of FIG. 2.

In the error signal generating section 103, the output voltage obtained through the capacitor C115 is divided by resistors R121 and R122, and the divided voltage is applied to the inverting input terminal of the operational amplifier 106 through a resistor R125.

The operational amplifier 106 is an inverting amplifier for forming the error signal for performing feedback control. A reference voltage divided by resistors R123 and R124 is applied to the non-inverting input terminal of the operational amplifier 106, and a desire error signal is outputted by performing differential amplification between the reference voltage and the voltage divided by the resistors R121 and R122.

On the other hand, in the step-up/step-down control section 104, a sawtooth wave signal is outputted by a sawtooth wave oscillating circuit 615. The sawtooth wave signal has a frequency of about 200 kHz or higher, and serves as a base of the PWM control signal.

The sawtooth wave signal outputted from the sawtooth wave oscillating circuit 615 is inputted to the inverting input terminal of a comparator 630 through a capacitor C627 after a DC offset voltage has been added thereto by voltage-dividing resistors R 628 and R629.

The error signal outputted from the operational amplifier 106 is applied to the non-inverting input terminal of the comparator 630.

The comparator 630 compares the voltage of the error signal with the voltage of the sawtooth wave signal, and if the voltage of the error signal is higher than the voltage of the sawtooth wave signal, then the comparator 630 outputs a signal corresponding to "H"; and if the voltage of the error signal is lower than the voltage of the sawtooth wave signal, then the comparator 630 outputs a signal corresponding to "L". Each of these signals serve as a base of the step-down PWM control signal.

On the other hand, the sawtooth wave signal is applied to the inverting input terminal of an operational amplifier 631 so as to be inversely amplified. The inversely amplified sawtooth wave signal is then inputted to a monostable multivibrator 634. Upon receiving the rising edges of the input signal, the monostable multivibrator 634 outputs an one-shot pulse signal having a width of 5% the period of the sawtooth wave signal. The one-shot pulse signal is provided for generating the minimum duty ratio of the PWM control signal for performing the PWM control during the MIX control period. The details about the one-shot pulse signal will be described later.

The one-shot pulse signal outputted from the monostable multivibrator 634 is inputted to an input terminal of an AND gate 636 through a NOT gate 635. The output signal of the comparator 630 is applied to the other input terminal of the AND gate 636.

Further, the one-shot pulse signal inverted by the NOT gate 635 is inputted to a terminal Cp of a D-type flip-flop (referred to as "D-FF" hereinafter) 637. The D-FF 637 brings a signal outputted from an up/down control section (referred to as "U/D control section" hereinafter) 638 into synchronization with the rising edges of the one-shot pulse signal inverted by the NOT gate 635 to generate a step-up/step-down switching control signal, the signal serving as a base of the step-up/step-down switching control signal. In other words, since the logic value of a terminal D at the time when the rising edge is applied to the terminal Cp is outputted to a terminal Q, the step-up/step-down switching control signal is brought into synchronization with the PWM control signal. The details about the synchronization processing performed in the MIX control will be described later.

The operation of an U/D control section 638 will be described below.

The voltage of the battery 105 is inputted to the U/D control section 638 through an A/D converter 639. In other words, the voltage of the battery 105 is measured, and the measured voltage data is inputted to the U/D control section 638.

The U/D control section 638 is formed by a microcomputer, and has the output voltage (i.e., the target voltage) of the converter circuit section 102 previously stored therein.

The U/D control section 638 detects the voltage range of the battery 105 relative to the target voltage, and generates a control signal according to the detected voltage range.

The step-up/step-down switching control signal obtained from the terminal Q of the D-FF 637 is inputted to an OR gate 646.

The output signal of the AND gate 636 is also applied to the OR gate 646.

When the step-up/step-down switching control signal outputted from the terminal Q of the D-FF 637 is "H", the first FET 111 will be in "ON" state regardless of the logic of the output signal of the AND gate 636.

In other words, when the step-up/step-down switching control signal is "H", since the first FET 111 is in "ON" state regardless of the state of the step-down PWM control signal outputted from the AND gate 636, the step-down switching control will not be performed.

When the step-up/step-down switching control signal outputted from the terminal Q of the D-FF 637 is "L", the first FET 111 will perform "ON"/"OFF" operation according to the logic of the output signal of the AND gate 636.

In other words, when the step-up/step-down switching control signal is "L", the step-down PWM control signal outputted from the AND gate 636 will be applied to the first FET 111 to perform the step-down switching control.

On the other hand, the sawtooth wave signal outputted from the sawtooth wave oscillating circuit 615 is inputted to the inverting input terminal of a comparator 643 through a capacitor C640 after a DC offset voltage is added thereto by voltage-dividing resistors R 641 and R642.

The error signal outputted from the operational amplifier 106 is applied to the non-inverting input terminal of the comparator 643.

The comparator 643 compares the voltage of the error signal and the voltage of the sawtooth wave signal, and if the voltage of the error signal is higher than the voltage of the sawtooth wave signal, then the comparator 643 outputs a signal corresponding to "H"; and if the voltage of the error signal is lower than the voltage of the sawtooth wave signal, then the comparator 643 outputs a signal corresponding to "L". Each of these signals serves as a base of the step-up PWM control signal.

The one-shot pulse signal outputted from the monostable multivibrator 634 is inputted to an input terminal of an OR gate 644. The output signal of the comparator 643 is applied to the other input terminal of the OR gate 644.

The step-up/step-down switching control signal obtained from the terminal Q of the D-FF 637 is inputted to an AND gate 645.

The output signal of the OR gate 644 is also applied to the AND gate 645.

When the step-up/step-down switching control signal outputted from the terminal Q of the D-FF 637 is "L", the second FET 110 will be in "OFF" state regardless of the logic of the output signal of the OR gate 644.

In other words, when the step-up/step-down switching control signal is "L", since the second FET 110 is in "OFF" state regardless of the state of the step-up PWM control signal outputted from the OR gate 644, the step-up switching control will not be performed.

When the step-up/step-down switching control signal outputted from the terminal Q of the D-FF 637 is "H", the second FET 110 will perform "ON"/"OFF" operation according to the logic of the output signal of the OR gate 644.

In other words, when the step-up/step-down switching control signal is "H", the step-up PWM control signal outputted from the OR gate 644 will be applied to the second FET 110 so as to perform the step-up switching control.

As described above, the step-down PWM control section corresponds to the sawtooth wave oscillating circuit 615 and the comparator 630.

The step-up PWM control section corresponds to the sawtooth wave oscillating circuit 615 and the comparator 643.

The step-down PWM control switch corresponds to the OR gate 646.

The step-up PWM control switch corresponds to the AND gate 645.

The MIX controlling section corresponds to the U/D control section 638 and the D-FF 637.

Figure 7:
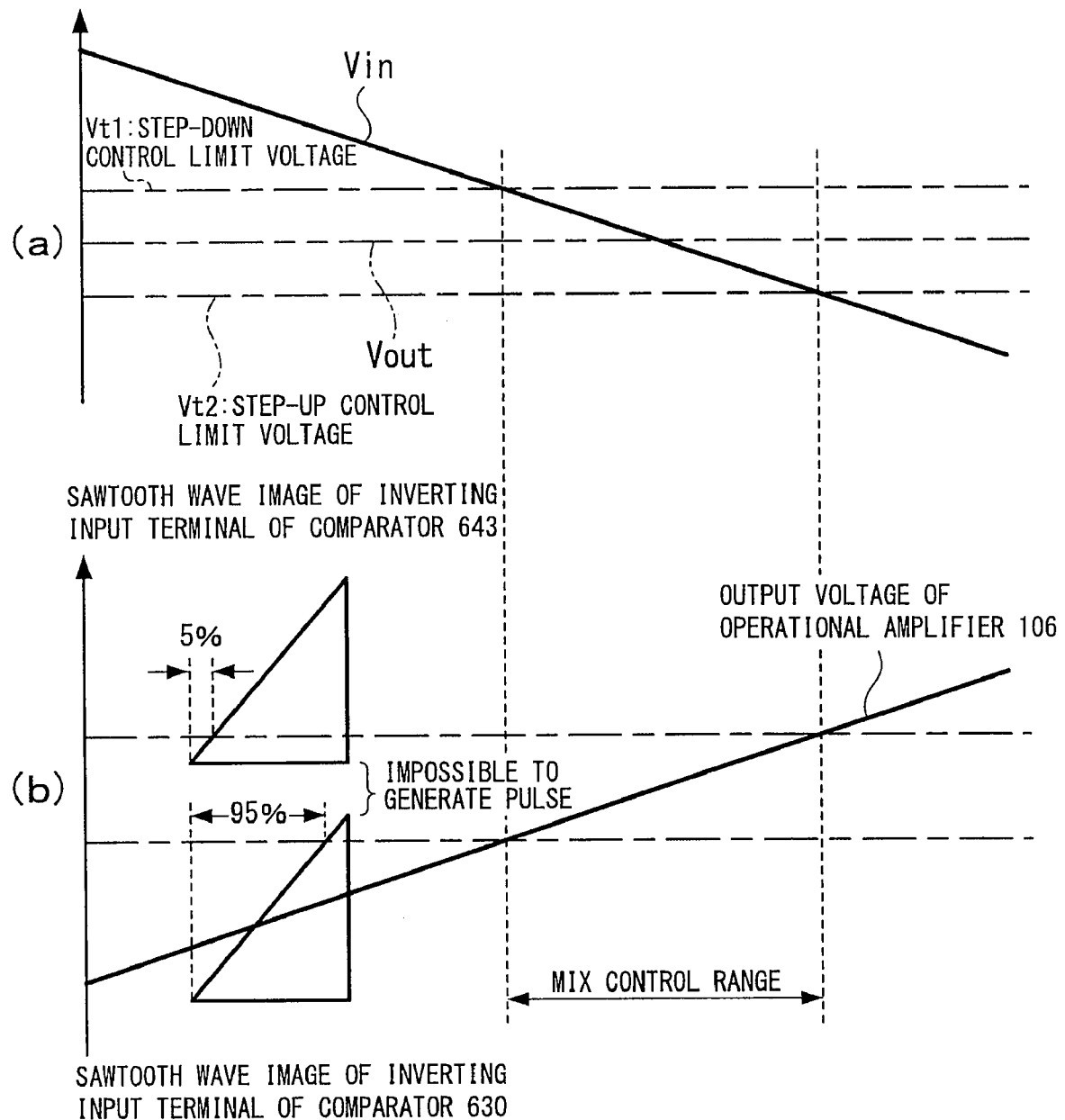
FIG. 7 is a voltage image graph explaining the operation of the DC/DC converter according to the first embodiment of the present invention.
Figure 8:
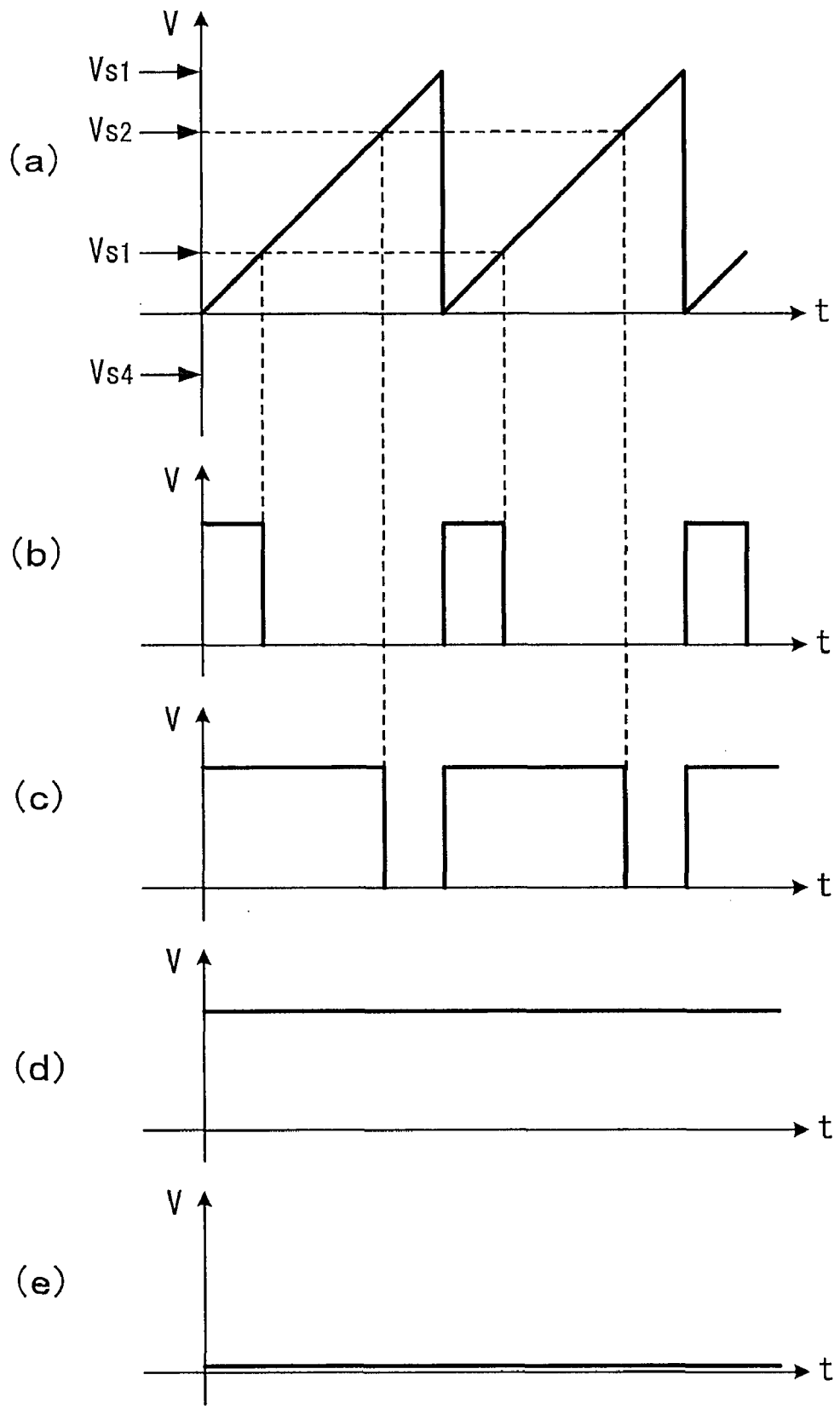
FIG. 8 is a graph showing the relationship between a sawtooth wave signal, an error signal and PWM control signals.

FIGS. 7(*a*) and (*b*) are voltage image graphs explaining the control operation of the DC/DC converter 601 shown in FIG. 6. In FIGS. 7(*a*) and (*b*), the ordinate represents the voltage, and the abscissa represents the time. Note that, the scale of the time axis here is properly set in order to facilitate the description, and does not represent the actual time scale of operation of the circuit.

FIG. 7(*a*) shows change of the voltage Vin between the terminals of the battery 105 with respect to the time axis.

FIG. 7(b) shows change of the output voltage of the operational amplifier 106 with respect to the time axis.

As shown in FIG. 7(a), the level of output signal of the operational amplifier 106 rises as the voltage Vin between the terminals of the battery 105 drops.

When the voltage Vin reaches the step-down control limit voltage Vt1, the MIX control needs to be started.

At this time, the step-down PWM control signal has to be a pulse signal having a ratio of 95:5 so as to perform a minimum step-down control.

In other words, in the subsequent comparator 630, as shown in FIG. 7(b), a pulse signal having a ratio of 95:5 has to be generated according to the result of comparing the voltage of the output signal of the operational amplifier 106 with the voltage of the sawtooth wave signal. In FIG. 7(b), the waveform of one cycle of the sawtooth wave signal is superimposed on the output signal of the operational amplifier 106, wherein the time axis is ignored. In order to bring the sawtooth wave signal and the output signal of the operational amplifier 106 into the relationship as the sawtooth wave image of the inverting input terminal of the comparator 630 shown in FIG. 7(b), an offset voltage needs to be added to the sawtooth wave signal by the voltage-dividing resistors R628 and R629 (see FIG. 6).

Similarly, in the subsequent comparator 643, a pulse signal having a ratio of 5:95 has to be generated according to the result of comparing the voltage of the output signal of the operational amplifier 106 with the voltage of the sawtooth wave signal. In order to bring the sawtooth wave signal and the output signal of the operational amplifier 106 into the relationship as the sawtooth wave image of the inverting input terminal of the comparator 643 shown in FIG. 7(b), an offset voltage needs to be added to the sawtooth wave signal by the voltage-dividing resistors R641 and R642 (see FIG. 7).

It is known that, within the MIX control range shown in FIG. 7(b), there is a possibility that the PWM control signal may not be outputted from the comparator 630 and the comparator 643. This is because that the error signal may exceed the voltage range of the sawtooth wave signal.

The minimum step-down control and the minimum step-up control have to be performed within the MIX control range.

In order to generate a minimum PWM control signal, an auxiliary pulse signal is generated by the monostable multivibrator 634, and the generated auxiliary pulse signal is superimposed on the output of the comparator 630 and the output of the comparator 643, so that the concern that the PWM control signal may not be generated within the period of the MIX control is eliminated.

FIGS. 8(a), (b), (c), (d) and (e) are graphs showing the relationship between the sawtooth wave signal, the error signal and the PWM control signals outputted by the comparators 630 and 643. Note that, in order to facilitate the description, the offset voltage added to the sawtooth wave signal is excluded from consideration in these graphs, and both the sawtooth wave signal and the error signal are consistently considered as relative voltage differences.

FIG. 8(a) is a graph showing the voltage of the sawtooth wave signal and the voltage of the error signal. The sawtooth wave signal is a sawtooth wave outputted by the sawtooth wave oscillating circuit 615. Vs1, Vs2, Vs3 and Vs4 on the ordinate are voltages of the error signals for being compared by the comparators 630 and 643.

FIG. 8(b) is a graph showing the waveform of the PWM control signal when the voltage of the error signal shown in FIG. 8(a) is Vs1. In other words, FIG. 8(b) is a graph showing the output of the comparator 630 or 643 when the voltage of the error signal is Vs1. The comparator outputs a high voltage (H) only in a range where the voltage of the error signal is higher than the voltage of the sawtooth wave. The comparator outputs a low voltage (L) if not in such a range.

FIG. 8(c) is a graph showing the waveform of the PWM control signal when the voltage of the error signal shown in FIG. 8(a) is Vs2. In other words, FIG. 8(b) is a graph showing the output of the comparator 630 or 643 when the voltage of the error signal is Vs2. The high voltage output period of the comparator is long compared with the case when the voltage of the operational amplifier 106 is Vs1.

FIG. 8(d) is a graph showing the waveform of the PWM control signal when the voltage of the error signal shown in FIG. 8(a) is Vs3. In other words, FIG. 8(d) is a graph showing the output of the comparator 630 or 643 when the voltage of the error signal is Vs3. When the voltage of the error signal becomes Vs3, the voltage of the error signal almost equals to the peak voltage of the sawtooth wave. Thus, the high voltage output period of the comparator extends to the entire period of the sawtooth wave.

FIG. 8(e) is a graph showing the waveform of the PWM control signal when the voltage of the error signal shown in FIG. 8(a) is Vs4. In other words, FIG. 8(e) is a graph showing the output of the comparator 630 or 643 when the voltage of the error signal is Vs4. When the voltage of the error signal becomes Vs4, the voltage of the error signal is lower than the bottom voltage of the sawtooth wave. Thus, the high voltage output period of the comparator is eliminated.

It can be known from FIGS. 8(a), (b) and (c) that the duty ratio of the "ON" state of the PWM control signal is larger in the case where the voltage of the error signal is Vs2 than in the case where the voltage of the error signal is Vs1.

It can be known from FIGS. 8(a) and (d) that, when the voltage of the error signal is Vs3, the voltage of the error signal almost equals to the peak voltage of the sawtooth wave, and the output signal is merely a DC voltage, which can not be called as "PWM control signal".

It can be known from FIGS. 8(a) and (e) that, when the voltage of the error signal is Vs4, the voltage of the error signal is lower than the bottom voltage of the sawtooth wave, the output signal is in a non-signal state, which can not be called as "PWM control signal".

In the case where the phenomenon described when describing FIG. 7(b) occurs (i.e., in the case where "the error signal exceeds the voltage range of the sawtooth wave signal"), the comparator 630 will outputs a control signal shown in FIG. 8(d).

In the case where the phenomenon described when describing FIG. 7(b) occurs (i.e., in the case where "the error signal exceeds the voltage range of the sawtooth wave signal"), the comparator 643 will outputs a control signal shown in FIG. 8(e).

FIG. 9(a), (b), (c), (d), (e), (f), (g), and (h) are time charts schematically showing the waveforms of each of portions of the circuit of FIG. 6 during the MIX control period.

Figure 9:
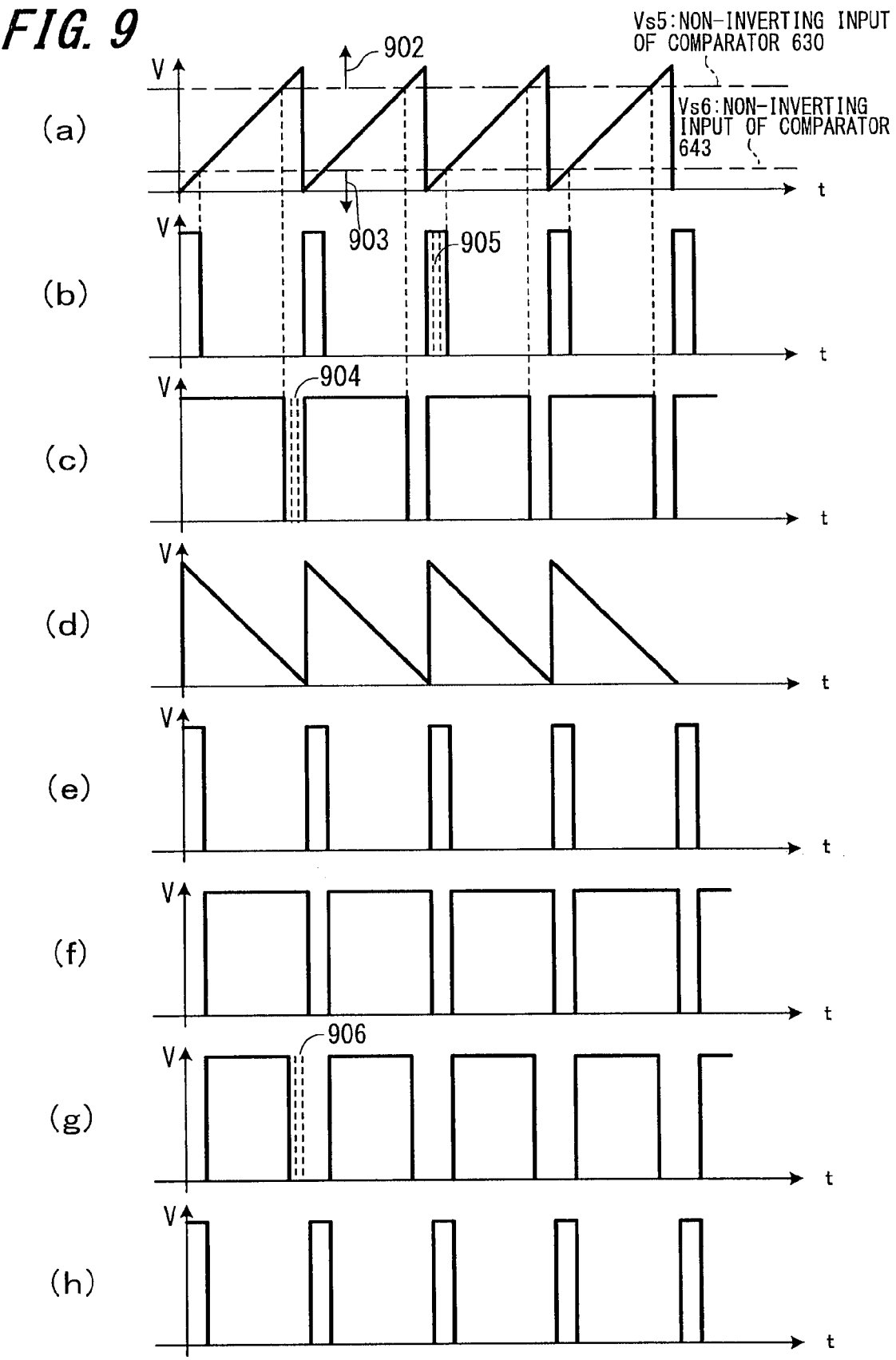
FIG. 9 is a time chart schematically showing the waveforms of each of portions of the circuit during the MIX control period.

FIG. 9(a) shows the sawtooth wave signal generated by the sawtooth wave oscillating circuit 615. As shown in FIG. 9(a), Vs5 indicated by the chain line schematically shows the error signal applied to the non-inverting input terminal of the comparator 630. Vs6 indicated by the two-dot chain line schematically shows the error signal applied to the non-inverting input terminal of the comparator 643. These error signals are common signal in the circuit diagram of FIG. 9, different offset voltages are added to the sawtooth wave signals at the comparator 630 and the comparator 643. Herein, FIG. 9(a) is a time chart in which the sawtooth wave signals are considered as a common reference, and the output signals of the operational amplifier 106 are conversely considered as output signals having different offset voltages added thereto.

FIG. 9(*b*) shows the output signal outputted from the comparator 643 during the MIX control period. Such a signal serves as the PWM signal, and is generated by comparing the voltage of the error signal with the voltage of the sawtooth wave signal generated by the sawtooth wave oscillating circuit 615. In FIG. 9(*a*), the intersections of the waveform of the sawtooth wave and the two-dot chain line correspond to the falling edges of such a signal.

FIG. 9(*c*) shows the output signal outputted from the comparator 630 during the MIX control period. Such a signal serves as the PWM signal, and is generated by comparing the voltage of the error signal with the voltage of the sawtooth wave signal generated by the sawtooth wave oscillating circuit 615. In FIG. 9(*a*), the intersections of the waveform of the sawtooth wave and the chain line correspond to the falling edges of the aforesaid signal. As can be known by comparing FIG. 8(*b*) with FIG. 8(*c*), since the DC offset voltage added to the sawtooth wave signal inputted to the comparator 630 is different from the DC offset voltage added to the sawtooth wave signal inputted to the comparator 643, the duty ratio of the output signal of the comparator 630 is different from the duty ratio of the output signal of the comparator 643.

FIG. 9(*d*) shows the sawtooth wave signal inversely amplified by the operational amplifier 631.

FIG. 9(*e*) shows the output signal of the monostable multivibrator 634. In response to the rising edges of the sawtooth wave signal (d) inversely amplified by the operational amplifier 631, the monostable multivibrator 634 outputs the one-shot pulse signal having a duty ratio of 5%.

The output signal (e) of the monostable multivibrator 634 is inverted by the NOT gate 635, and the inverted signal is shown in FIG. 9(*f*).

FIG. 9(*g*) shows the output signal of the AND gate 645. Namely, the output signal of the monostable multivibrator 634 is invert by the NOT gate 635 so as to obtain the output signal (f), and the output signal of the AND gate 645 is a logical AND of the output signal (c) outputted by the comparator 630 and the output signal (f) inverted by the NOT gate 635.

FIG. 9(*h*) shows the output signal of the OR gate 646. Namely, the output signal of the OR gate 646 is a logical OR of the output signal (b) outputted by the comparator 643 and the output signal shown (e) outputted by the monostable multivibrator 634.

It has been explained in FIG. 7(*b*) that there may exist a voltage range where the comparator 630 can not generate the PWM pulse signal during the MIX control period (i.e., the voltage range expressed as "impossible to generate pulse" in FIG. 7(*b*)). Which means that, in the step-down control, the pulse width shown in FIG. 9(*c*) becomes 100%.

Specifically, which represents a case where the error signal voltage Vs5 of FIG. 9(*a*) moves toward a direction indicated by an arrow 902, namely, the error signal voltage Vs5 rises and becomes higher than the peak voltage of the sawtooth wave.

Thus, as shown by dotted lines 904, the pulse width shown in FIG. 9(*c*) becomes 100%.

As a result, the minimum step-down control can not be performed.

Thus, in order to generate the minimum step-down control PWM signal, the one-shot pulse signal having a minimum width are generated by the monostable multivibrator 634(*e*), the generated one-shot pulse signal is inverted by the NOT gate 635(*f*), and the logical AND of the inverted signal and the original PWM signal (c) is obtained (g), so that even if the original PWM signal is eliminated (dotted line 904), the minimum PWM signal can be obtained (dotted line 906).

Herein, in order to generate a PWM signal having a duty ratio of 95%, the one-shot pulse signal (e) (which is a pulse signal having extremely small width) generated by the monostable multivibrator 634 is inverted by the NOT gate 635 (f). For this reason, the raising timing of the obtained PWM signal is shifted by a time lag equal to the time interval of the one-shot pulse signal (e). In other words, the step-up/step-down switching control signal has to be subjected to a synchronization processing to eliminate the time lag. Thus, the output (f) of the NOT gate 635 is inputted to the terminal Cp of the D-FF 637.

Similarly, in the step-up control, there may exist a voltage range where the comparator 643 can not generate the PWM pulse signal during the MIX control period (i.e., the voltage range expressed as "impossible to generate pulse" in FIG. 7(*b*)). Which means that, in the step-up control, the pulse width shown in FIG. 9(*b*) becomes 0%.

Specifically, which represents a case where the error signal voltage Vs6 of FIG. 9(*a*) moves toward a direction indicated by an arrow 903, namely, the error signal voltage Vs6 drops and becomes lower than the bottom voltage of the sawtooth wave. Thus, as shown by dotted lines 905, the pulse width shown in FIG. 9(*b*) becomes 0%.

As a result, the minimum step-up control can not be performed.

Thus, in order to generate the minimum step-up control PWM signal, the pulse signal having the minimum width is generated by the monostable multivibrator 634(*e*), and the logical OR of the generated pulse signal and the original PWM signal (b) is obtained (h), so that the minimum PWM signal can be obtained even if the original PWM signal is eliminated.

Different from the case of the step-down PWM signal, since the logical OR of the pulse signal having the minimum width and the original PWM signal (b) is obtained, the raising timing of the obtained PWM signal will not be shifted. Thus, no influence will be exerted even when the output (f) of the NOT gate 635 is inputted to the terminal Cp to shift the timing.

By implementing the MIX control according to the present embodiment, even when the voltage difference between the input voltage and the output voltage is smaller than the voltage difference generated based on the duty ratio of the PWM control, voltage conversion can be achieved with excellent voltage conversion efficiency, which can not achieved by the PWM control of a conventional DC/DC converter.

Incidentally, it can be known by performing computer simulation analysis to the circuit of the present embodiment that, the overshoot caused by the present embodiment when switching the ratio of the MIX control is smaller than the overshoot caused by conventional control methods. Thus, with the present embodiment, the overshoot pulse generated when switching voltage control will have less influence to the circuit of the load.

Figure 10:
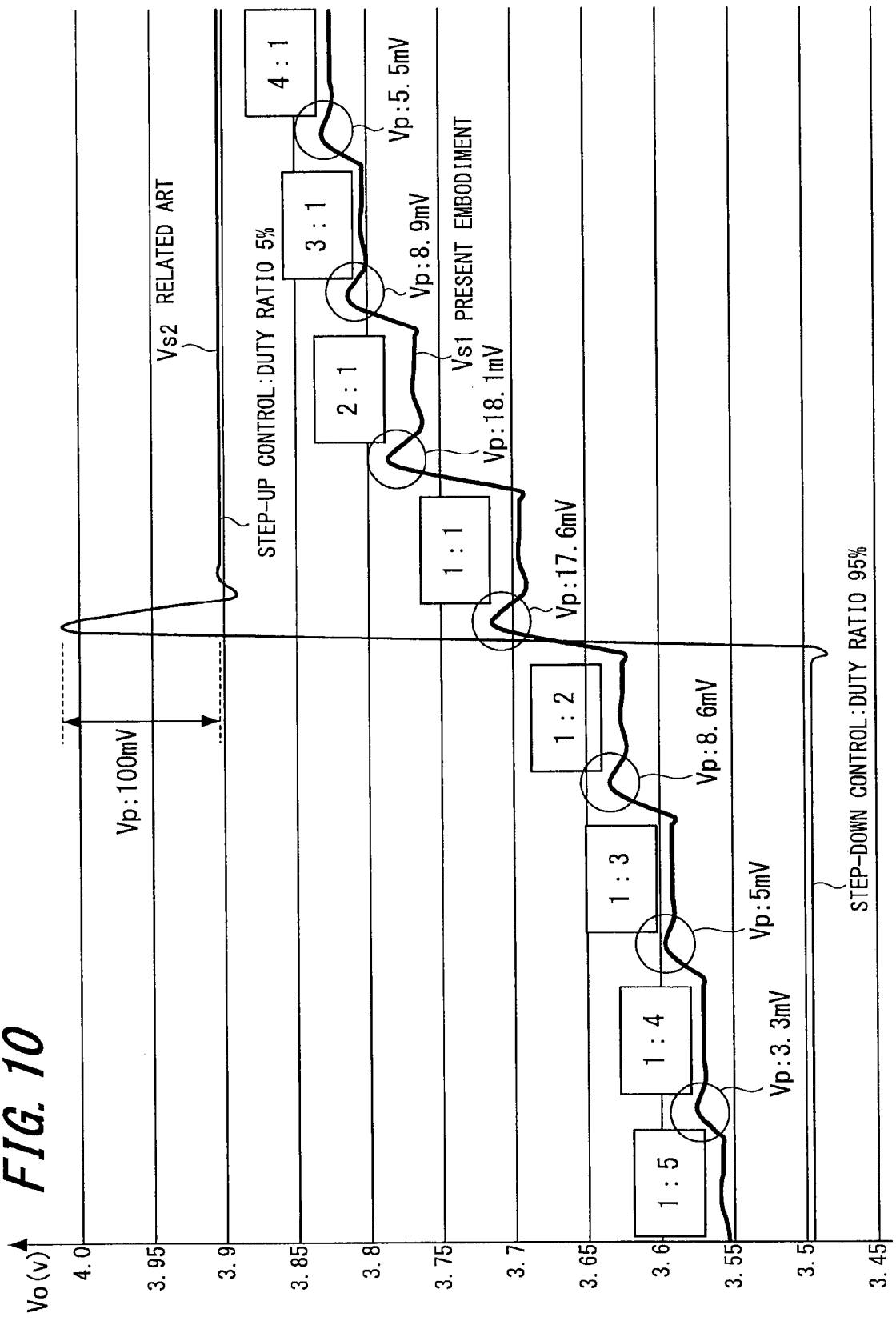
FIG. 10 is a graph showing a result obtained by performing computer simulation analysis to the output voltage fluctuation caused when performing step-down/step-up control with no MIX control of the first embodiment, and to the output voltage fluctuation caused when performing step-down/step-up control with MIX control of the first embodiment.

FIG. 10 is a graph showing a result obtained by performing computer simulation analysis to the output voltage fluctuation caused when performing a conventional step-down/step-up control with no MIX control, and to the output voltage fluctuation caused when performing MIX control of the present embodiment, wherein the input voltage is fixed to 3.7V.

With the conventional art, when the voltage control is shifted from the step-down control having a duty ratio of 95% to the step-up control having a duty ratio of 5%, an overshoot pulse of about 100 mV are caused to an output voltage Vs2.

With the present embodiment, when the step-down/step-up ratio gradually changes in the MIX control, an overshoot pulse caused to an output voltage Vs1 does not exceed 18 mV. Thus, with the present embodiment, the adverse influence caused by the overshoot pulse is very small compared to that of the conventional art.

The aforesaid embodiment includes the following applications.

[Application 1]

In the configuration shown in FIG. 6, the monostable multivibrator 634 is used in order to obtain the PWM signal which is a pulse signal having the minimum width. However, by properly designing the circuit of the dynamic range, biasing and the like of the input voltage of the comparator, the voltage range where the pulse can not be generated as shown in FIG. 7(*b*) can be prevented. In such a configuration, the monostable multivibrator 634, the NOT gate 635, the AND gate 636 and the OR gate 644 are eliminated, the output of the operational amplifier 631 is directly connected to the OR gate 646, and the output of the comparator 643 is directly connected to the AND gate 645.

[Application 2]

In the configuration shown in FIG. 6, the monostable multivibrator 634 is used in order to obtain the PWM signal which is a pulse signal having the minimum width. Instead of using the monostable multivibrator 634, the output voltage outputted from the operational amplifier 106 at the time when the MIX control is started is held by a sample-and-hold circuit using a control signal from the U/D control section 638, so that pulses having a duty ratio of 95% can be constantly obtained from the comparator 630 during the MIX control period.

Figure 11:
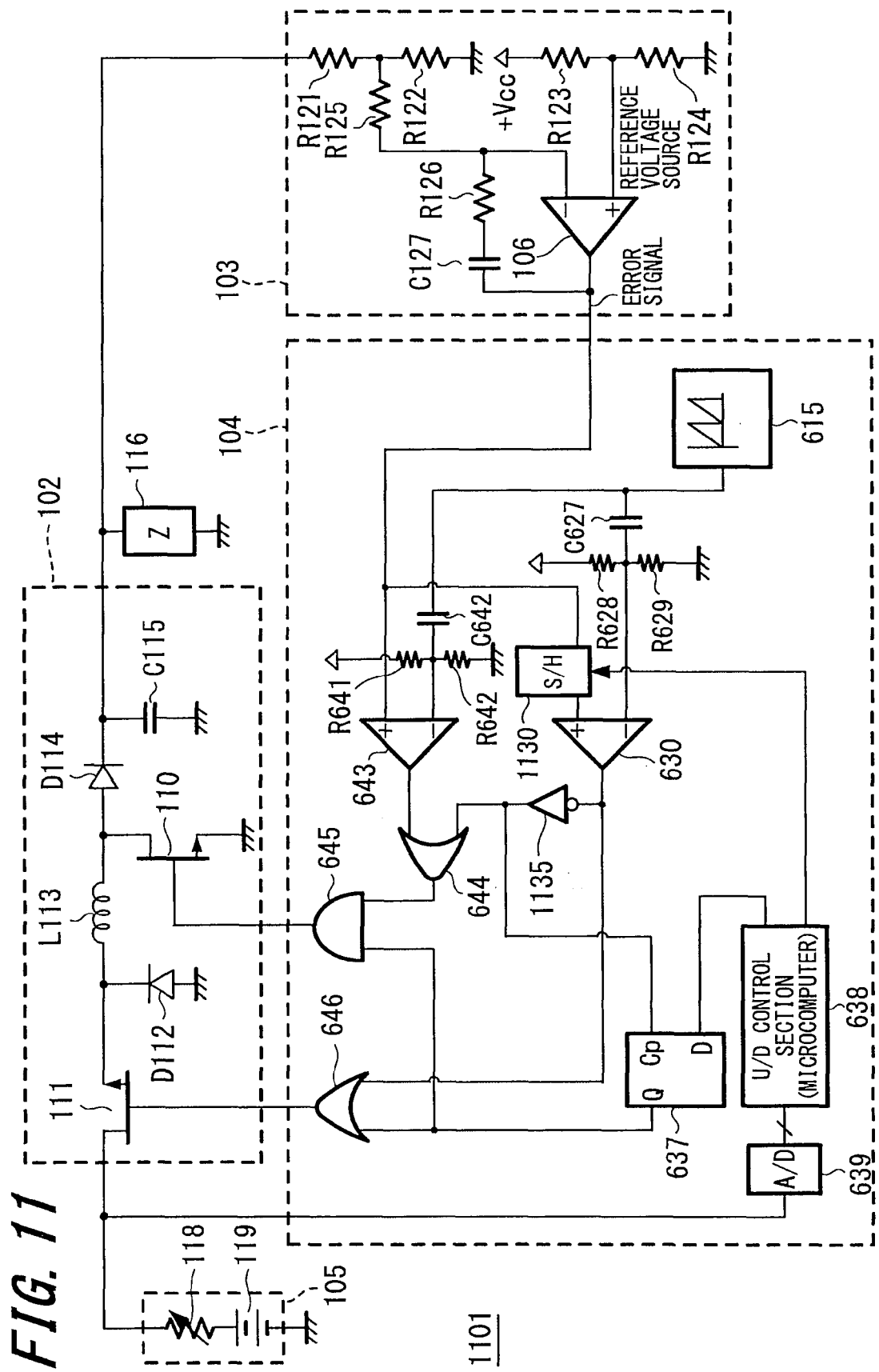
FIG. 11 is another example of the circuit diagram of the DC/DC converter according to the first embodiment of the present invention.

FIG. 11 is a circuit diagram showing such an application, and is formed by changing a part of FIG. 6.

A sample-and-hold circuit 1130 holds the voltage outputted from the operational amplifier 106 using a signal outputted from the U/D control section 638, the signal indicating the MIX control period. The held voltage serves as a reference voltage for generating the pulses having a duty ratio of 95%, and the pulses having a duty ratio of 95% is outputted from the comparator 630.

In such a configuration, the AND gate 636 shown in FIG. 6 is eliminated, the output of the comparator 630 is inverted by the NOT gate 1135, and the output of the NOT gate 1135 is not only supplied to the OR gate 644 but also supplied to the terminal Cp of the D-FF 637 to perform timing matching.

[Application 3]

In FIG. 6, instead of employing the AND gate 636 and the OR gate 644, the output signal of the monostable multivibrator 634 and the output signal of the comparator 643 may also be selected by switching under the control of the control signal from the U/D control section 638, and the selected signal is outputted.

Figure 12:
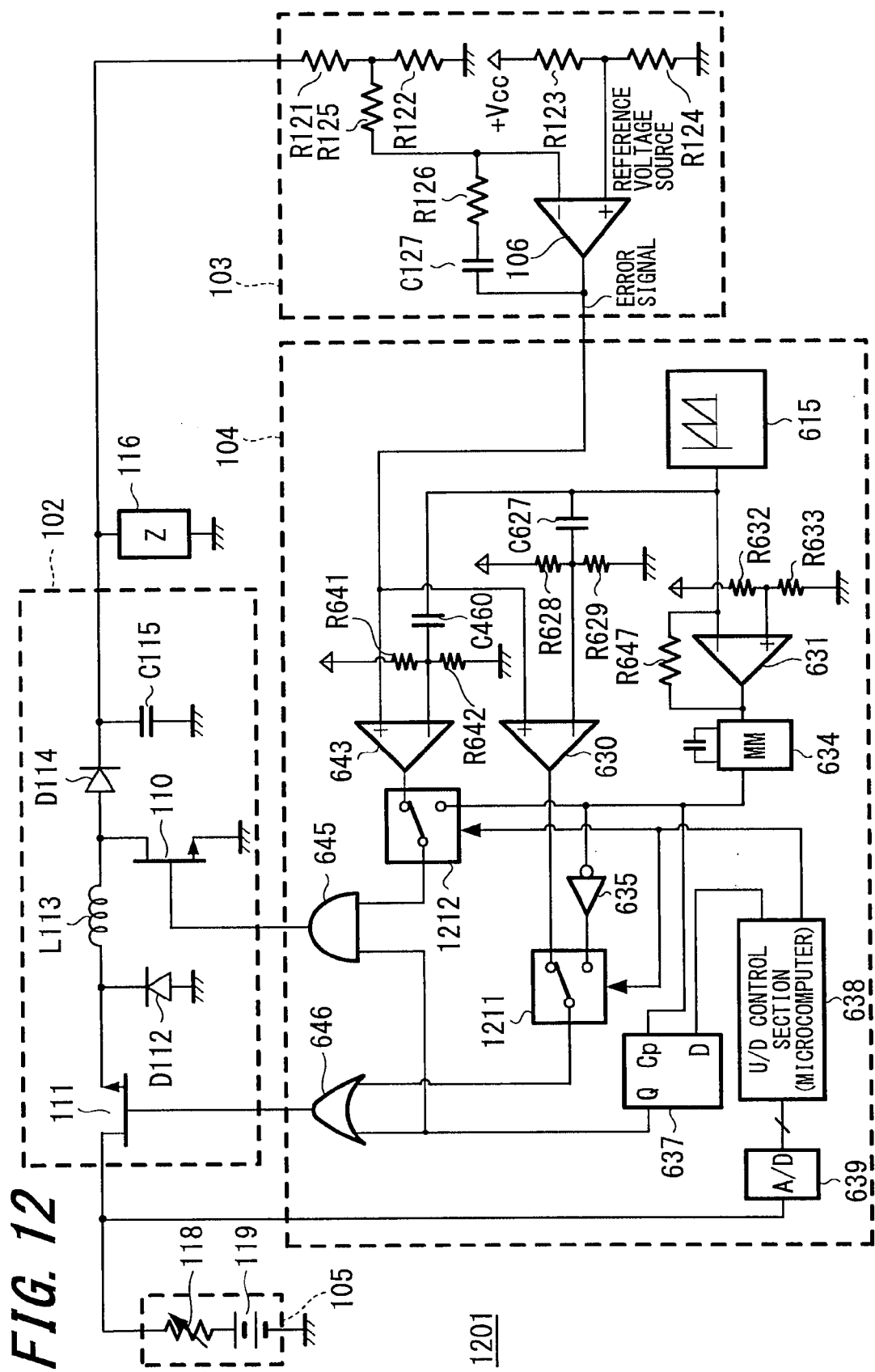
FIG. 12 is further another example of the circuit diagram of the DC/DC converter according to the first embodiment of the present invention.

FIG. 12 is a circuit diagram showing such an application, and is formed by changing a part of FIG. 6.

The output signal of the monostable multivibrator 634 is inverted by the NOT gate 635, and a first switch 1211 selectively switches between the output signal of the comparator 630 and the output signal of the NOT gate 635 and outputs the selected signal using a signal outputted from the U/D control section 638, the signal indicating the MIX control period.

Similarly, a second switch 1212 selectively switches between the output signal of the comparator 643 and the output signal of the monostable multivibrator 634 and outputs the selected signal using a signal outputted from the U/D control section 638, the signal indicating the MIX control period.

In such a configuration, the output pulse of the monostable multivibrator 634 is directly inputted to the terminal Cp of the D-FF 637 to perform timing matching.

[Application 4]

In FIG. 6, the analog circuit portion of the step-up/step-down control section 104 can be digitized.

Figure 13:
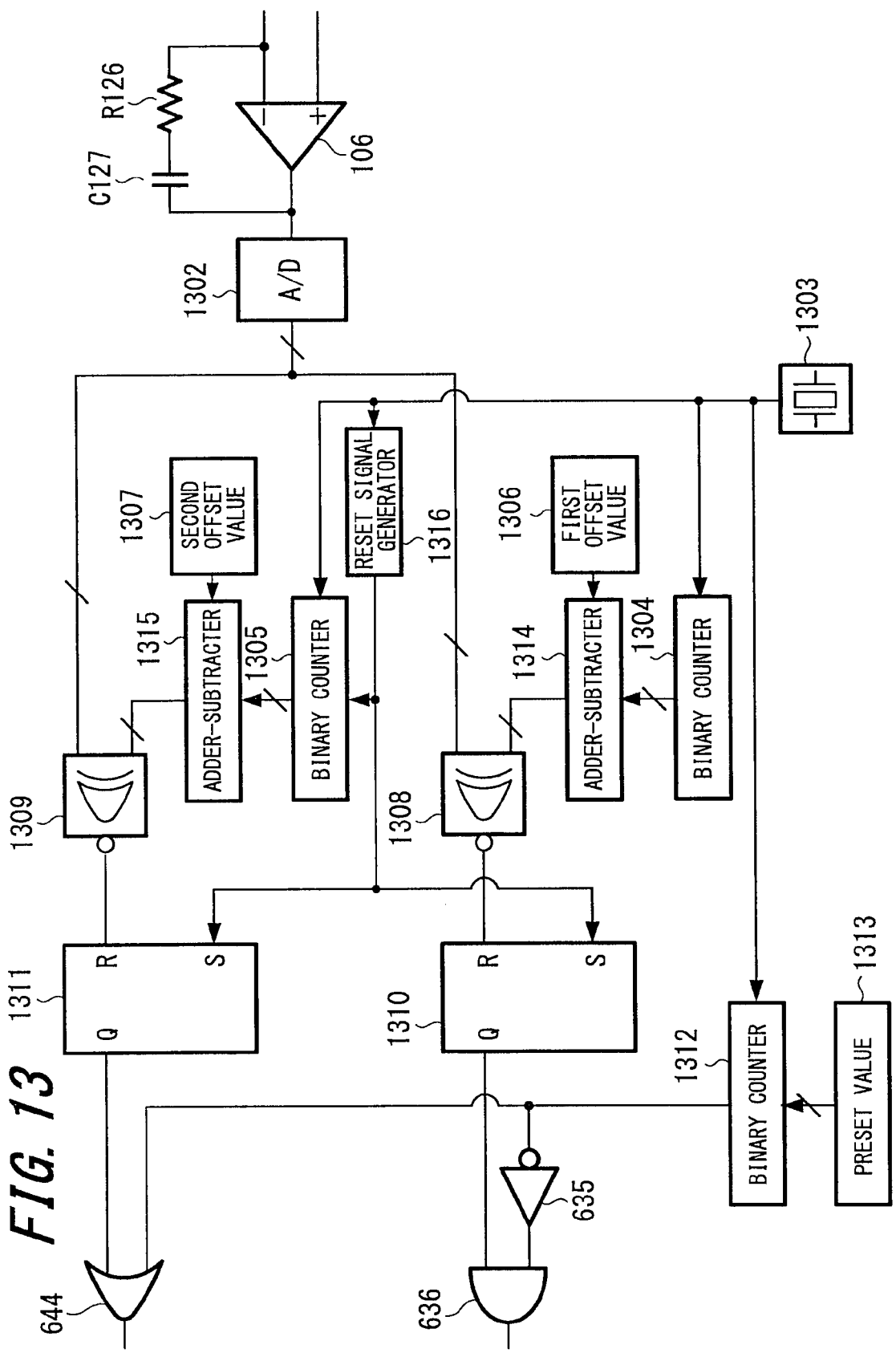
FIG. 13 is further another example of the circuit diagram of the DC/DC converter according to the first embodiment of the present invention.

FIG. 13 is formed by replacing the sawtooth wave oscillating circuit 615, the comparator 630, the comparator 643, the operational amplifier 631 and the monostable multivibrator 634 of the step-up/step-down control section 104 shown in FIG. 6 with a digital circuit.

The error signal outputted from the operational amplifier 106 is converted into digital signal by an A/D converter 1302.

On the other hand, a clock generator 1303 supplies operation clocks to the entire digital circuit.

The operation clocks of the clock generator 1303 are inputted to binary counters 1304 and 1305 respectively.

The binary counters 1304 and 1305 are known loop counters.

The counter output value of the binary counter 1304 is supplied to an adder-subtracter 1314.

On the other hand, a first offset value 1306 is also supplied to the adder-subtracter 1314, and the adder-subtracter 1314 outputs the value obtained by adding the two values supplied thereto.

Similarly, the counter output value of the binary counter 1305 is supplied to an adder-subtracter 1315, and the adder-subtracter 1315 outputs the value obtained by adding a second offset value 1307 and the counter output value of the binary counter 1305.

In other words, the binary counters 1304 and 1305 have the function of generating sawtooth wave (i.e., the function of the sawtooth wave oscillating circuit 615). Further, the first offset value 1306 corresponds to the offset voltage generated by the resistors R628 and R629, and the second offset value 1307 corresponds to the offset voltage generated by the resistors R641 and R642.

On the other hand, a reset signal generator 1316 is formed by a loop counter which counts the clock and outputs reset pulses when the counter value reaches a predetermined value. The reset pulse serves as reset signal of the binary counters 1304 and 1305, and therefore has a function of determining the period of the sawtooth wave. The larger the counter value of the reset signal generator 1316 (i.e., the counter value of the loop counter) is, the longer the period of the sawtooth wave is.

Coincidence detectors 1308 and 1309 output signals corresponding to "H" state if the values of the binary counters 1304 and 1305 is in coincidence with the value of the A/D converter 1302. In order to achieve such a function, each bit of two parallel inputs is provided with an exclusive OR gate, and all output of the exclusive OR gates is inputted to an OR gate, and the output of the OR gate is finally inverted.

The reset pulse of the reset signal generator 1316 is inputted to a terminal S of a RS flip-flop (referred to as "RS-FF" hereinafter) 1310 and a terminal S of a RS-FF 1311.

Herein, the counter values of the binary counters 1304 and 1305 are set more widely than bit range of the output of the A/D converter 1302. When the operation of the aforesaid two binary counters is in up counter operation, the upper limit of the counter values are the same value, and is set to a value slightly larger than the maximum value of the output bit of the A/D converter 1302.

At the time when the reset signal generator 1316 generates the reset pulse (H), since the output of the coincidence detectors 1308 is in "L" state, a terminal Q of the RS-FF 1310 is in "H" state (i.e., set state).

When the reset signal generator 1316 counts the next clock, the reset pulse will not be generated, and the terminal S will be in "L" state. Since the output of the coincidence detectors 1308 remains in "L" state, the terminal Q of the RS-FF 1310 will remain in "H" state.

Although the binary counter 1304 keeps counting, the coincidence detector 1308 remains in "L" state as long as no coincidence between two pieces of input information is detected by the coincidence detectors 1308.

When the coincidence detectors 1308 detects the coincidence between two pieces of input information, "H" will be inputted to a terminal R of the RS-FF 1310. At this time, the terminal Q of the RS-FF 1310 is in "L" state.

When counting the next clock, the coincidence detectors 1308 outputs "L" again. Thus, the terminal Q of the RS-FF 1310 remains in "L" state.

Since the operation of the RS-FF 1311 is identical to the operation of the RS-FF 1310, the description thereof is omitted.

As can be known from the description above, the RS-FF 1310 and RS-FF 1311 perform the PWM control signal output function of the comparators 630 and 643.

A binary counter 1312 outputs pulses having a predetermined width based on a preset value 1313. This function equals to the function of the monostable multivibrator 634.

[Application 5]

In FIG. 6, the analog circuit portion of the step-up/step-down control section 104 can be digitized.

Figure 14:
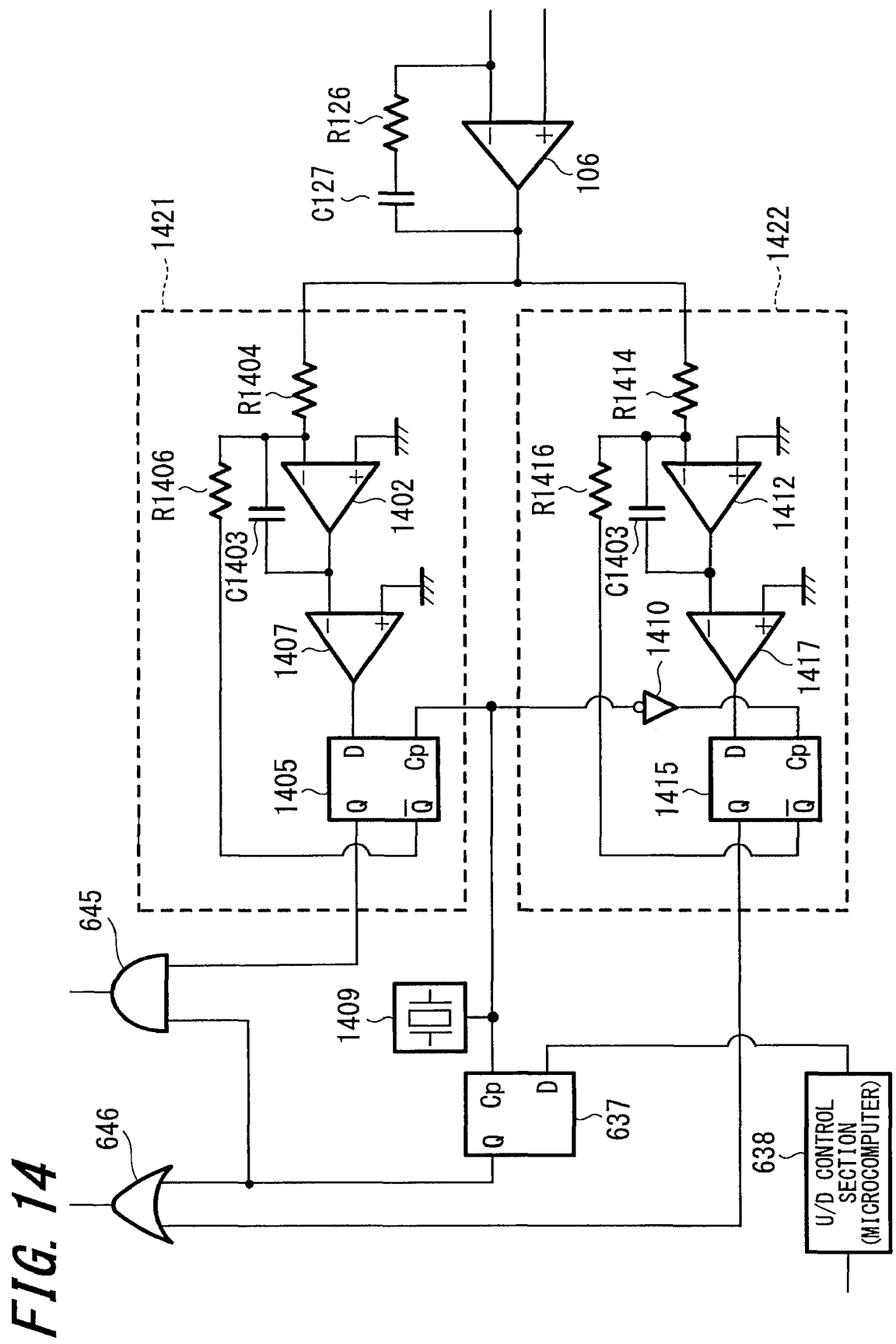
FIG. 14 is further another example of the circuit diagram of the DC/DC converter according to the first embodiment of the present invention.

FIG. 14 is formed by replacing the sawtooth wave oscillating circuit 615, the comparators 630 and 643 configuring the PWM modulating circuit of the step-up/step-down control section 104 shown in FIG. 6 with a delta-sigma modulating circuit (referred to as "ΔΣ modulating circuit" hereinafter).

The error signal outputted from the operational amplifier 106 is inputted to a first ΔΣ modulating circuit (also called a "step-up delta-sigma control section") 1421 and a second ΔΣ modulating circuit (also called a "step-down delta-sigma control section") 1422.

The control signal output of the first ΔΣ modulating circuit 1421 is inputted to the AND gate (also called a "step-up delta-sigma control switch") 645.

The control signal output of the second ΔΣ modulating circuit 1422 is inputted to the OR gate (also called a "step-down delta-sigma control switch") 646.

The D-FF 637 and the U/D control section 638 configures a MIX controlling section for exclusively controlling the AND gate 645 and the OR gate 646.

The first ΔΣ modulating circuit 1421 will be described below. Since the second ΔΣ modulating circuit 1422 has the same circuit configuration as the first ΔΣ modulating circuit 1421, the description thereof is omitted.

An operational amplifier 1402, a capacitor C1403 and a resistor R1404 configure an integrator.

A resistor R1406 is connected between a terminal ¬Q (i.e., Q bar or NOT of Q) of a D-type flip-flop (referred to as "D-FF" hereinafter) 1405 and the inverting input terminal of the operational amplifier 1402. A resistor R1404 is connected between the output of the differential amplifier and the inverting input terminal of the operational amplifier 1402. The resistor R1406 and the resistor R1404 configures an adder.

The output signal of the operational amplifier 1402 is supplied to the inverting input terminal of a comparator 1407. The comparator 1407 compares the input signal with the ground potential, and outputs "1" or "0".

The output of the comparator 1407 is supplied to a terminal D of the D-FF 1405. The D-FF 1405 outputs the logic of the terminal D at rising edge timing of the clock supplied to a terminal Cp to the terminal Q, and outputs the inverted logic of the terminal D to the terminal ¬Q. Incidentally, the clock is generated by a clock generator 1409.

Through the NOT gate 1410, the first ΔΣ modulating circuit 1421 and the second ΔΣ modulating circuit 1422 alternately operate respectively at the rising edges and the falling edges of the clock. Further, the first ΔΣ modulating circuit 1421 and the second ΔΣ modulating circuit 1422 operate independently so that the error signal is converged.

Unlike the PWM modulating circuit, since the pulse having minimum width can be obtained for sure by the ΔΣ modulating circuit due to its characteristic, it is not necessary to provide a circuit corresponding to the monostable multivibrator 634.

[Application 6]

Further, instead of the circuit configuration of FIG. 9, there is another configuration which including a DSP (Digital Signal Processor, an operation processing integrated circuit device adapted to perform picture/sound processing) for performing digital control. In such a configuration, the PWM signal is the counter output value of a counter which counts the clock, instead of being the output signal of the rectangular wave oscillating circuit. The control voltage is A/D converted into voltage data, and PWM duty ratio is generated by performing arithmetic processing based on the obtained voltage data.

[Application 7]

According to the above description, after the ratio of the period of step-down/step-up control of the MIX control is shifted from n:1 to 1:1, the ratio is shifted from 1:1 to 1:n (n is natural number). The ratio may also be set to n:m (m and n are each natural number), and the ratio is subjected to a processing so that the output voltage approaches the target voltage. The voltage control can be performed more precisely using a ratio of the period of, for example, 10:4→9:4→10:5→9:5→10:6→8:5→9:6→10:7→9:7→10:8→8:7→9:8→10:9 →1:1.

Incidentally, when the ratio of the step-down/step-up control is set in such a manner, it is preferred that the ratio of the period is set so that the output voltage be equalized as much as possible. For example, in the case of the ratio of 10:4, instead of performing four periods of step-up control after having performed ten periods of step-down control, the control can be performed in a manner of step-down 2→step-up 1→step-down 2→step-up 1→step-down 2→step-up 1→step-down 2→step-up 1→step-down 2.

Second Embodiment

Figure 15:
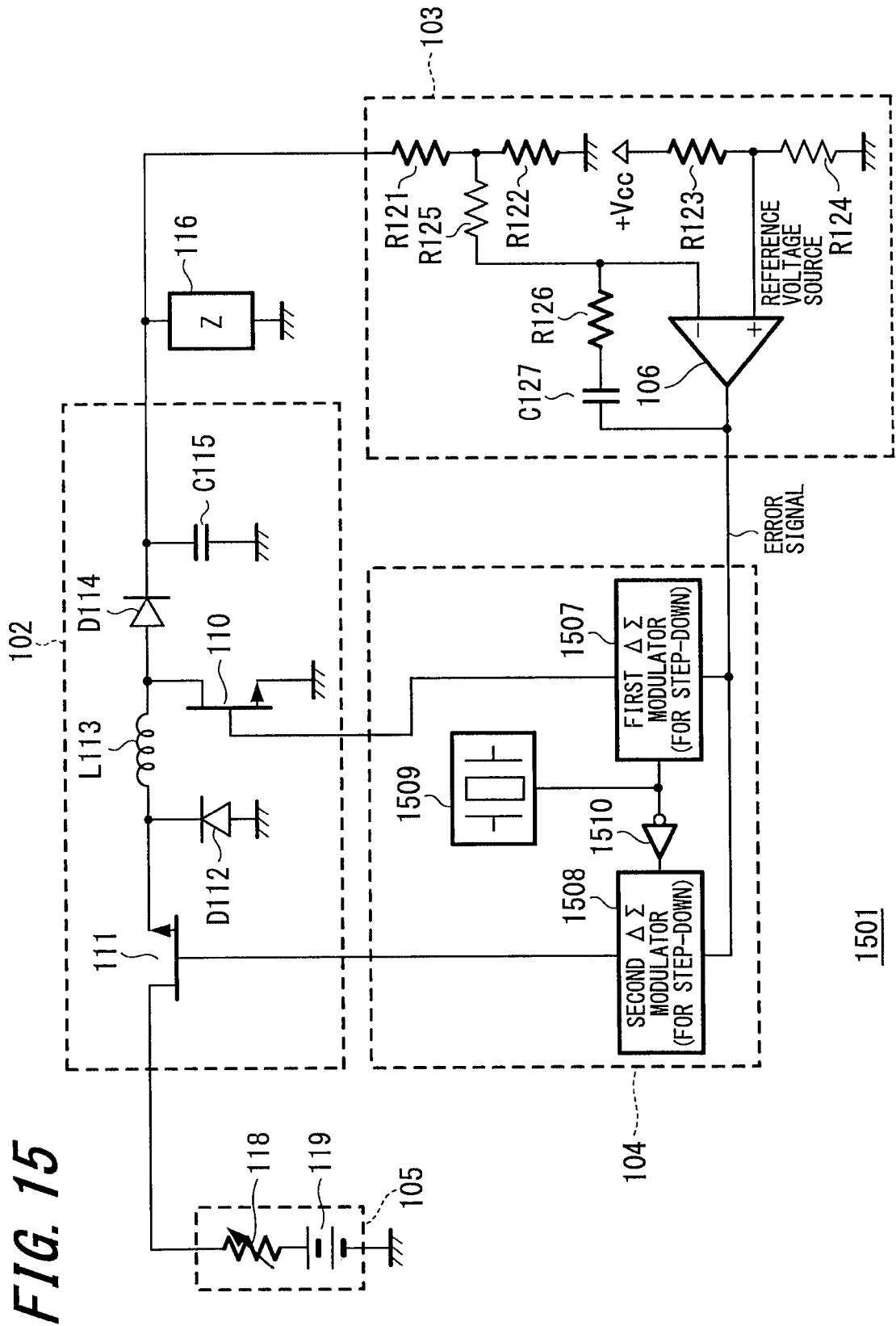
FIG. 15 is a block diagram showing a DC/DC converter according to the second embodiment of the present invention.

FIG. 15 is a block diagram showing a DC/DC converter as an example of the second embodiment of the present invention.

The aforesaid block diagram is a mixed type circuit diagram constituted by circuit elements and blocks showing function.

A DC/DC converter 1501 can be divided into a converter circuit section 102, an error signal generating section 103 and a step-up/step-down control section 104. The present invention mainly relates to the step-up/step-down control section 104.

The converter circuit section 102 converts the voltage of a battery 105 (i.e., input voltage) into a predetermined voltage (i.e., an output voltage).

The battery 105 is a known battery. The battery 105 can be a primary battery or a secondary battery. The battery 105 is equivalently described as a voltage source 119 and an internal resistance 118. Namely, the internal resistance 118 increases as the battery is consumed.

The error signal generating section 103 is formed by a differential amplifier mainly configured by resistors R125 and R126, a capacitor C127 and an operational amplifier 106. The output voltage outputted from the converter circuit section 102 is divided by resistors R121 and R122, the divided voltage is compared with a reference voltage obtained from resistors R123 and R124, and a signal representing the difference is outputted.

The step-up/step-down control section 104 includes a first delta-sigma modulator (referred to as a "first $\Delta\Sigma$ modulator" hereinafter) 1507, a second delta-sigma modulator (referred to as a "second $\Delta\Sigma$ modulator" hereinafter) 1508 and a clock source 1509.

The first $\Delta\Sigma$ modulator 1507 and the second $\Delta\Sigma$ modulator 1508 have the same structure.

The first $\Delta\Sigma$ modulator 1507 is connected to the gate of a second FET 110 (which configures a step-up control switch) to control the ON/OFF operation of the second FET 110.

The second $\Delta\Sigma$ modulator 1508 is connected to the gate of a first FET 111 (which configures a step-down control switch) to control the ON/OFF operation of the first FET 111.

The converter circuit section 102 includes the first FET 111 (which configures a step-down control switch), a first diode D112, a coil L113, the second FET 110 (which configures a step-up control switch), a second diode D114 and a capacitor C115.

The first FET 111 is a switch for controlling power supply of the battery 105 in the converter circuit section 102, and the first FET 111 mainly controls to drop the voltage.

The first diode D112 is adapted to form a current path including a subsequent coil L113 during the OFF period of the step-down control switch.

The coil L113 is a known inductance element. The coil L113 and the subsequent capacitor C115 configure a LC filter to smooth a rectangular wave current. Further, the coil L113 serves both as an element for bringing about electricity storage function of the step-down converter and as an element for bringing about electricity storage function of the step-up converter, wherein the step-down converter is configured by the step-down control switch, the first diode D112 and the subsequent capacitor C115, and the step-up converter is configured by the subsequent step-up control switch, the subsequent second diode D114 and the subsequent capacitor C115.

The second FET 110 is a switch for performing control to raise the voltage in the converter circuit section 102.

The second diode D114 is adapted to prevent the current generated by the subsequent capacitor C115 from flowing into the step-up control switch during the "ON" period of the step-up control switch.

As described above, the capacitor C115 forms the LC filter together with the coil L113, and serves as an element for bringing about electricity storage function.

The output of the converter circuit section 102 is supplied to a load 116.

The output voltage obtained through the capacitor C115 is divided by the resistors R121 and R122, and the divided voltage is applied to the inverting input terminal of the operational amplifier 106 through the resistor R125.

The operational amplifier 106 is an inverting amplifier for forming a control signal for performing feedback control. A reference voltage divided by resistors R123 and R124 is applied to the non-inverting input terminal of the operational amplifier 106, and a desire control signal is outputted by performing differential amplification between the reference voltage and the voltage divided by the resistors R121 and R122.

An output signal of the differential amplifier (i.e., an error signal) is applied to both the first $\Delta\Sigma$ modulator 1507 and the second $\Delta\Sigma$ modulator 1508.

Upon receiving the error signal, the first $\Delta\Sigma$ modulator 1507 and the second $\Delta\Sigma$ modulator 1508 respectively control the ON/OFF operation of the second FET 110 and the first FET 111.

The clock source 1509 is inputted to both the first $\Delta\Sigma$ modulator 1507 and the second $\Delta\Sigma$ modulator 1508. However, a NOT gate 1510 is arranged between the second $\Delta\Sigma$ modulator 1508 and the clock source 1509. The NOT gate 1510 is provided for the purpose of increasing the resolution of the voltage control of the DC/DC converter 1501. Owing to the provision of the NOT gate 1510, the first $\Delta\Sigma$ modulator 1507 operates at rising edges of the clock, while the second $\Delta\Sigma$ modulator 1508 operates at falling edges of the clock.

Figure 16:
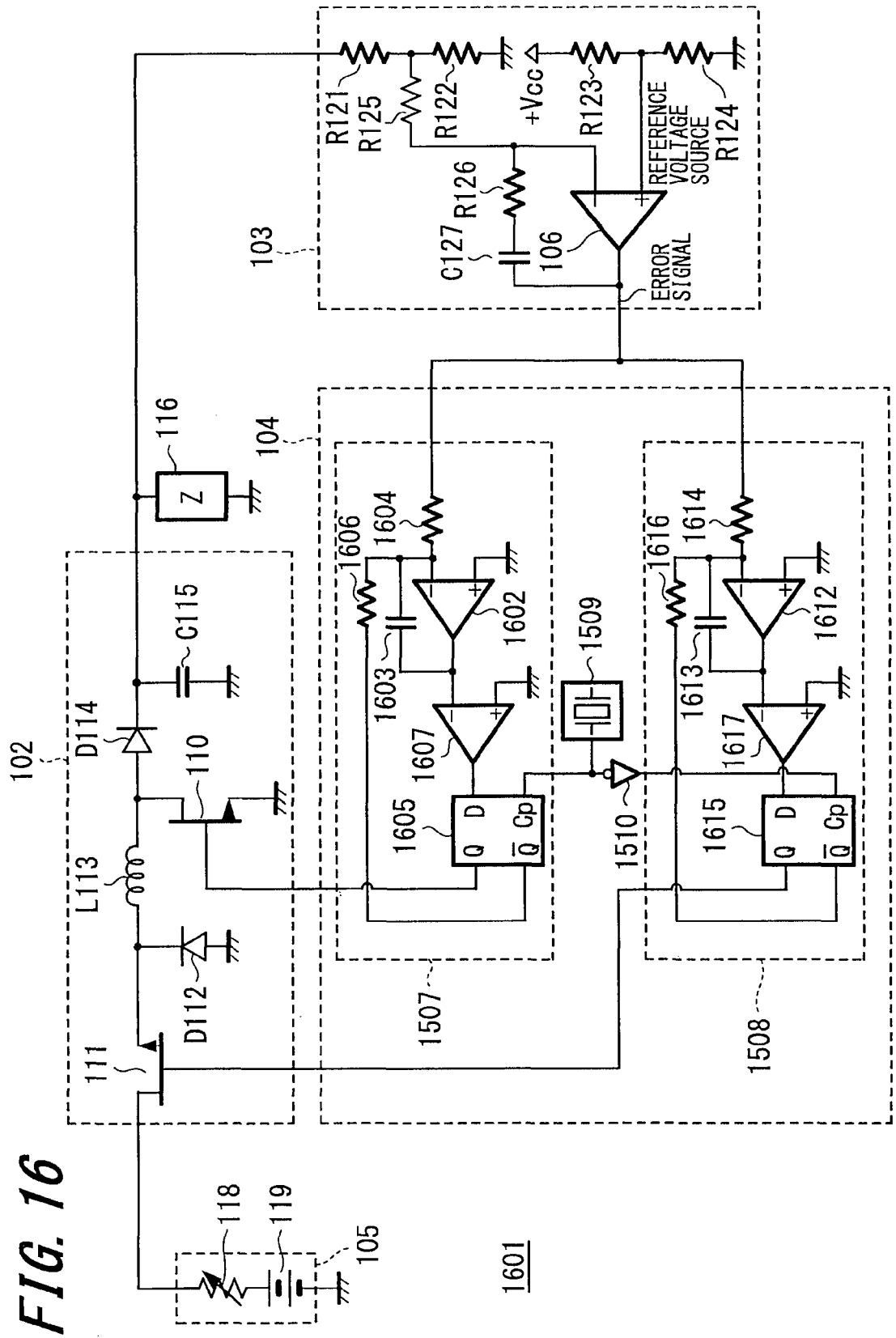
FIG. 16 is a circuit diagram of the DC/DC converter according to the second embodiment of the present invention.

FIG. 16 is a circuit diagram concretely showing the DC/DC converter shown in the block diagram of FIG. 15.

Since other parts than the first $\Delta\Sigma$ modulator 1507 and second $\Delta\Sigma$ modulator 1508 have the same structure as those shown in FIG. 15, the description thereof is omitted. Further, since the first $\Delta\Sigma$ modulator 1507 and second $\Delta\Sigma$ modulator 1508 not only have the same circuit configuration except for minor difference in circuit element for matching operating characteristic of the FET to be controlled but also have the same circuit operation, only the first $\Delta\Sigma$ modulator 1507 will be described below.

An operational amplifier 1602, a capacitor C1603 and a resistor R1604 configure an integrator.

A resistor R1606 is connected between a $\neg$Q (i.e., a Q-bar or a NOT of Q) of a D-FF 1605 and the inverting input terminal of the operational amplifier 1602. The resistor R1604 is connected between the output of the differential amplifier and the inverting input terminal of the operational amplifier 1602. The resistor R1606 and the resistor R1604 configures an adder.

The output signal of the operational amplifier 1602 (which configures the integrator) is supplied to the inverting input terminal of a comparator 1607. The comparator 1607 compares the input signal with the ground potential, and outputs "1" or "0".

The output of the comparator 1607 is supplied to a terminal D of the D-FF 1605. The D-FF 1605 outputs the logic of the terminal D at rising edge timing of the clock supplied to a terminal Cp to the terminal Q, and outputs the inverted logic of the terminal D to the terminal $\neg$Q.

The operation of both the step-down converter and the step-up converter configuring the converter circuit section 102 of the present embodiment will be described below.

FIGS. 5(a) and (b) are circuit diagrams of the step-down converter and the step-up converter configuring the converter circuit section 102 of the present embodiment.

FIG. 5(a) is the circuit diagram of the step-down converter; and FIG. 5(b) is the circuit diagram of the step-up converter.

First, circuit operation of the step-down converter will be described below with reference to FIG. 5(a). In FIG. 5(a), when the switch SW1 is turned on, the electric power from the power supply Vin is supplied to the capacitor C and a load R through the coil L. In other words, a current Ion flows into a parallel circuit of the capacitor C and the load R through the coil L. At this time, electrical energy is stored in the coil L and the capacitor C.

When the switch SW1 is turned off, the current in the coil L will try to flow continuously according to Lenz's law, so that the stored electrical energy will be released. Thus, the electrical energy stored in the coil L flows through the load R and the diode D1. In other words, the diode D1 is indispensable for forming a current path Ioff when the switch SW1 is turned off. At this time, the electrical energy stored in the capacitor C is also supplied to the load R.

When the switch SW1 is turned on again, the electric power from the power supply Vin is supplied to each of the circuit elements through the switch SW1, so that a current Ion is formed. Such electric power is supplied to the load R, however a part of the electric power is stored in the coil L and capacitor C.

By the aforesaid switching operation of the switch SW1, the voltage of the electric power Vin is converted into a voltage Vout applied to the load R according to equation (5).

[Equation 5]

$$Vout = \frac{Ion}{Ion + Ioff} Vin = \frac{Ion}{I} Vin \quad (5)$$

Where Ion represents "ON" period of the switch SW, Ioff represents "OFF" period of the switch SW, and I=Ion+Ioff.

In other words, the shorter the "ON" period of the switch SW1 is, the lower the input voltage is dropped to.

Figure 5:
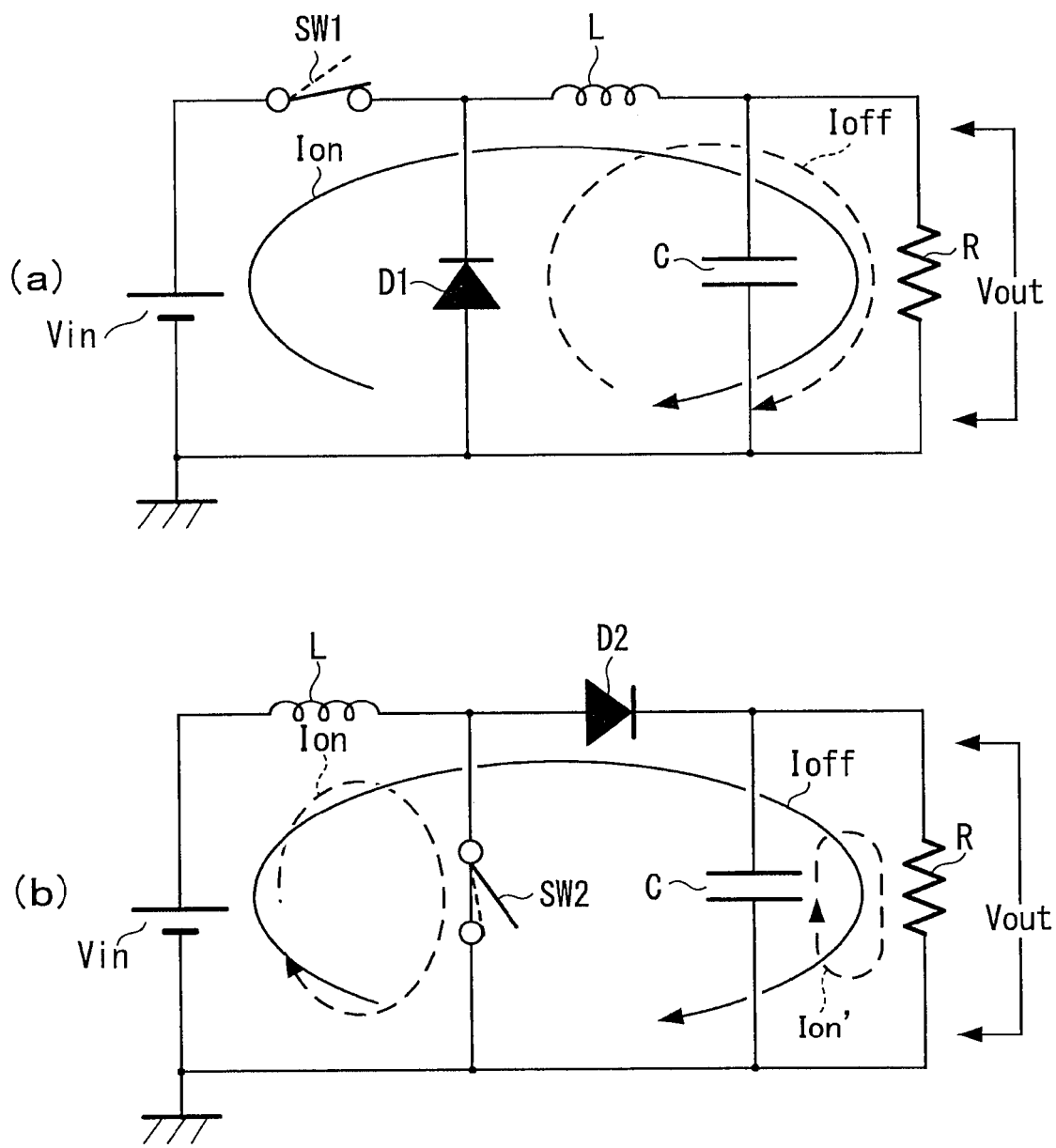
FIG. 5 is a view explaining the principle of a step-down converter and a step-up converter employed by both the first embodiment and the second embodiment of the present invention.

Next, the circuit operation of the step-up converter will be described below with reference to FIG. 5($b$). In FIG. 5($b$), when the switch SW2 is turned on, the electric power from the power supply Vin is stored in the coil L. In other words, a current Ion flows in a direction indicated by the dotted line.

Next, when the switch SW2 is turned off, the current in the coil L will try to flow continuously according to Lenz's law, so that the stored electrical energy will be released. At this time, the electrical energy stored in the coil L and the electric power from the power supply Vin are supplied to the load R through the diode D2. In other words, a current Ioff flows into a parallel circuit of the load R and the capacitor C through the diode D2. At this time, the electrical energy is stored in the capacitor C.

When the switch SW1 is turned on again, the current Ion generated by the electric power Vin flows through the coil L, so that the electrical energy is stored in the coil L. On the other hand, a current Ion' generated by the electrical energy stored in the capacitor C flows through the load R. At this time, since the diode D2 prevents reverse current from flowing therein, the electrical energy stored in the capacitor C does not flow into the switch SW2. The current Ion' from the capacitor C flows through the load R only.

By the aforesaid switching operation of the switch SW1, the voltage of the electric power Vin is converted into a voltage Vout applied to the load R according to equation (3).

[Equation 6]

$$Vout = \frac{Ion + Ioff}{Ioff} Vin = \frac{I}{Ioff} Vin \quad (6)$$

Where Ion represents "ON" period of the switch SW, Ioff represents "OFF" period of the switch SW, and I=Ion+Ioff.

In other words, the longer the "ON" period of the switch SW2 is, the higher the input voltage is raised to.

Figure 17:
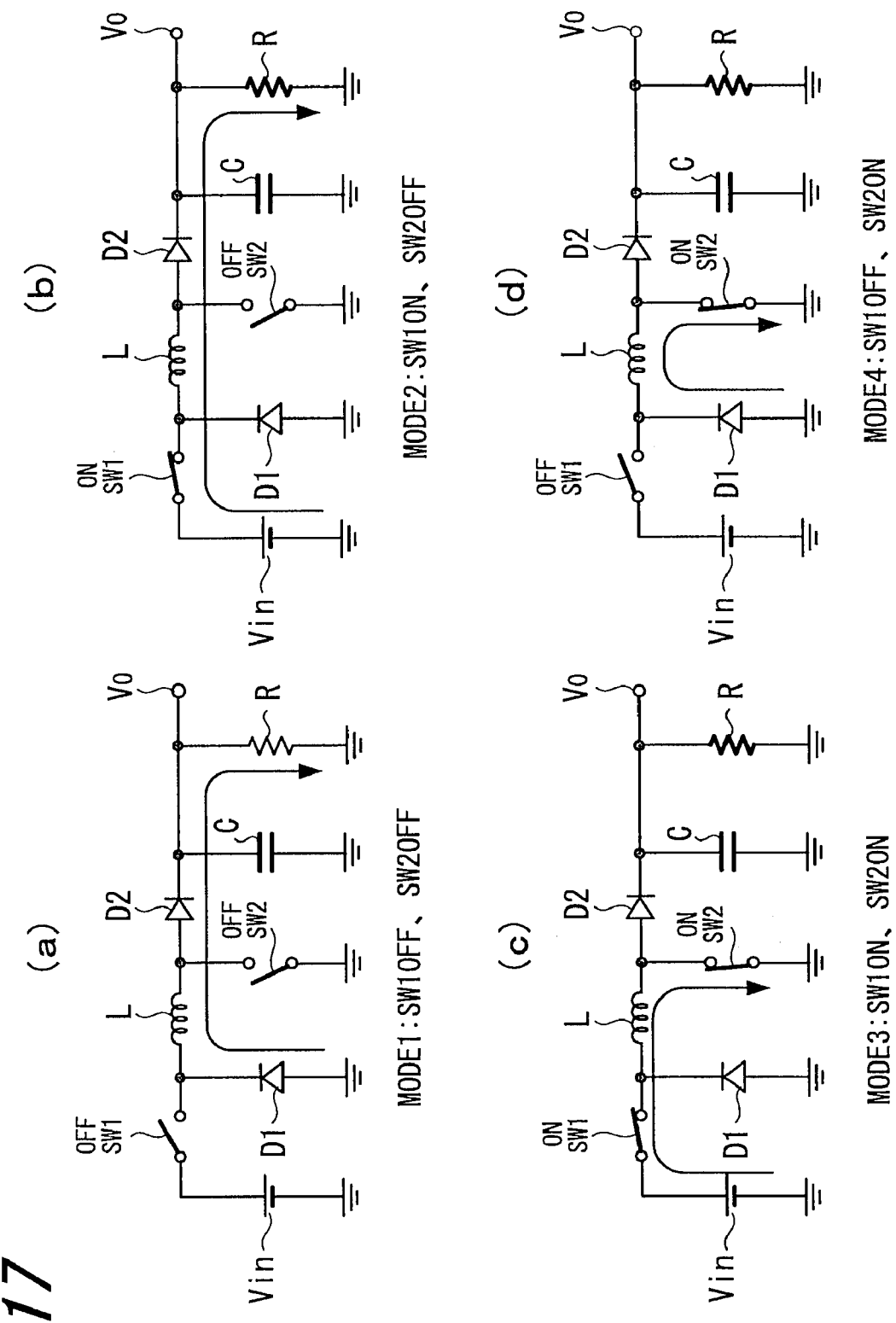
FIG. 17 is a view explaining the operation of the DC/DC converter according to the second embodiment of the present invention.

FIGS. 17($a$), ($b$), ($c$), and ($d$) explain the operation of the DC/DC converter according to the present embodiment.

In FIG. 5, there are the following ON-OFF combinations of the first switch and the second switch.

First switch: OFF; second switch: ON
First switch: ON; second switch: OFF
First switch: ON; second switch: ON In addition to the above ON-OFF combinations, there is another ON-OFF combination as following.

First switch: OFF; second switch: ON

In the below description, the ON-OFF combinations of "first switch: OFF; second switch: OFF" is called "mode 1" (see FIG. 17($a$)).

Further, the ON-OFF combinations of "first switch: ON; second switch: OFF" is called "mode 2" (see FIG. 17($b$)).

Further, the ON-OFF combinations of "first switch: ON; second switch: ON" is called "mode 3" (see FIG. 17($c$)).

Further, the ON-OFF combinations of "first switch: OFF; second switch: ON" is called "mode 4" (see FIG. 17($d$)).

Figure 18:
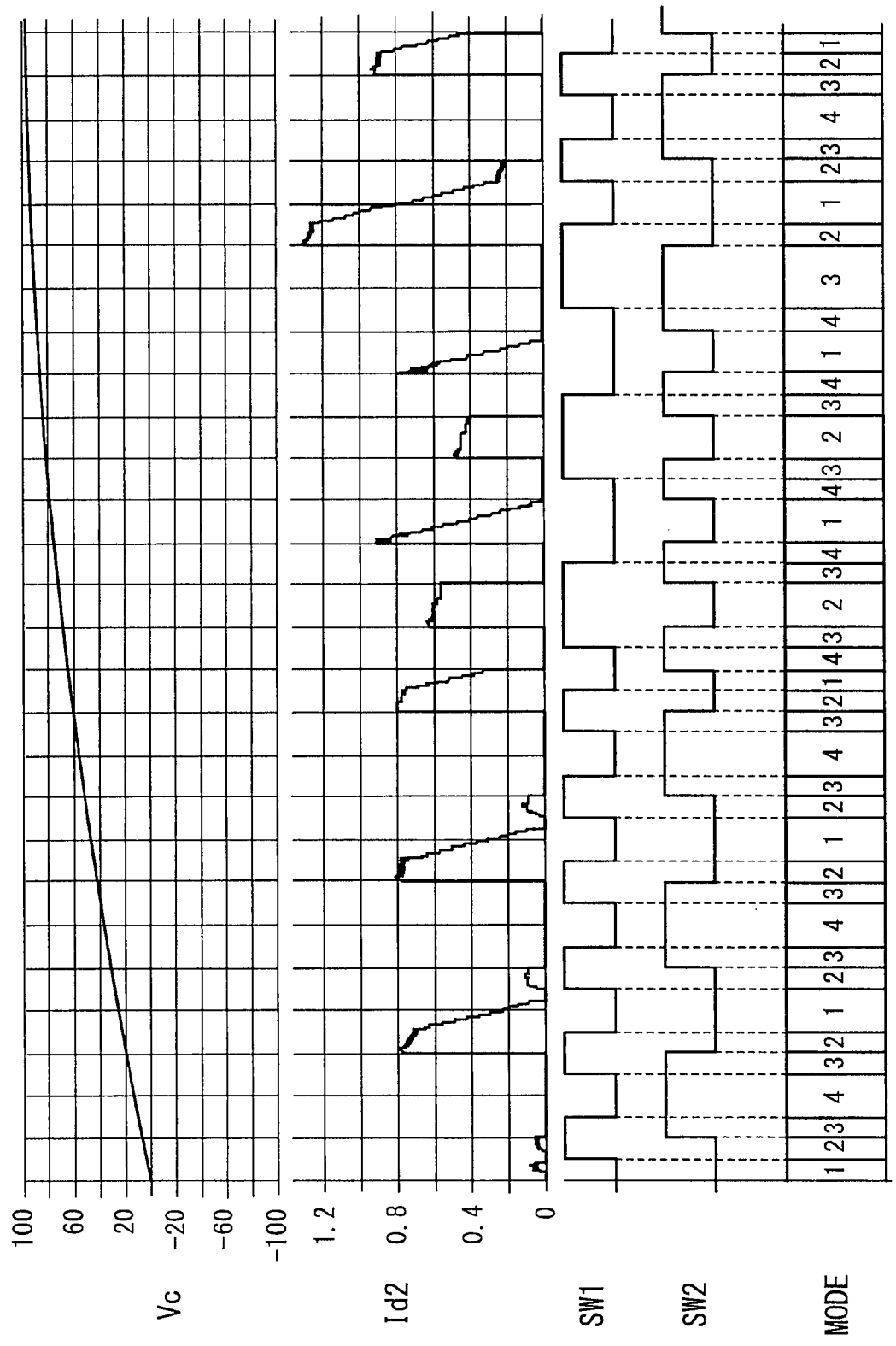
FIG. 18 shows a result of a computer simulation performed to the circuit of the DC/DC converter.

FIG. 18 shows a result of a computer simulation performed to the circuit shown in FIG. 16.

FIG. 18 shows a computer simulation result when a sine wave signal is applied instead of the output signal of the differential amplifier.

Vc represents the input voltage of the both ΔΣ modulators.

Id2 represents the current flowing through the second diode D114.

SW1 represents the state of the ON/OFF control of the first FET 111. SW2 represents the state of the ON/OFF control of the second FET 110. In both cases of SW1 and SW2, "ON" control is performed in high voltage ("H" of the logic), and "OFF" control is performed in low voltage ("L" of the logic).

Mode indicates which mode shown in FIG. 17 is in according to logic state of the SW1 and SW2.

The Id2 flows only when the current flows through the second diode D114. In other words, the Id2 flows only when the mode is in mode 1 or mode 2. However, as can be known from FIG. 18, the current does not constantly flow when the mode is in mode 1 or mode 2, but sometimes intermits. This is because the voltage of the capacitor C115 becomes equal to the voltage of the second diode D114, and therefore electricity storage to the capacitor C115 is in a saturated state.

Since the first FET 111 and the second FET 110 alternately perform switching operation at the rising edges and falling edges of the clock, the mode circularly changes from mode 1 until mode 4.

Namely, mode 1 can only be shifted to mode 2 or mode 4.
Similarly, mode 2 can only be shifted to mode 2 or mode 3.
Similarly, mode 3 can only be shifted to mode 2 or mode 4.
Similarly, mode 4 can only be shifted to mode 3 or mode 1.
Mode 1 can not be shifted to mode 3 directly, and vice versa.
Mode 2 can not be shifted to mode 4 directly, and vice versa.

By alternately controlling mode 1 and mode 2, an operation equivalent to the operation of the step-down converter shown in FIG. 5($a$) can be achieved.

By alternately controlling mode 2 and mode 3, an operation equivalent to the operation of the step-up converter shown in FIG. 5($b$) can be achieved.

By alternately controlling mode 3 and mode 4, induced charges are stored in the coil L113, and the current to be supplied to the load is caused using the charges of the capacitor C115.

By alternately controlling mode 4 and mode 1, the current of the coil L113 is supplied to both the capacitor C115 and the load.

Ultimately, the voltage applied to the load (i.e., the potential of the capacitor C115) rises when the current is supplied to the capacitor C115 and drops when the current to the capacitor C115 is cut off.

The voltage will rise if time of mode 2 is long.

The voltage will drop if time of mode 3 and mode 4 is long.

From described above, the output voltage of the DC/DC converter 1601 can be calculated by equation (7). Herein, Io is the current flowing through the load 116.

[Equation 7]

$$Vo = \frac{1}{C} \int (Id2 - Io) dt \quad (7)$$

Where Vo represents the output voltage of the DC/DC converter, C represents the capacitance of the capacitor, Id2 represents the current flowing through the second diode, and Io represents the output voltage of the DC/DC converter.

Figure 19:
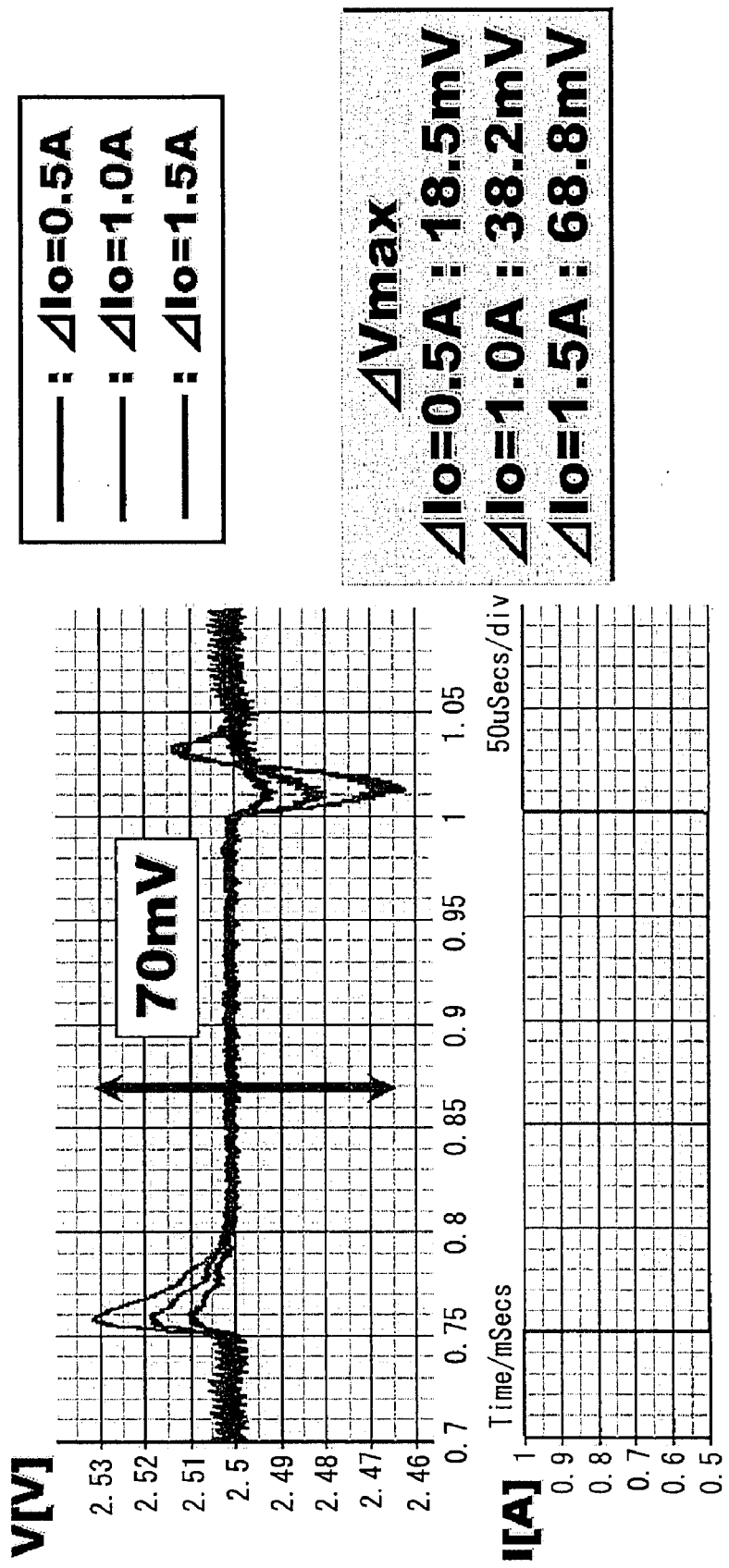
FIG. 19 is a view showing an output transient response characteristic against load fluctuation of the DC/DC converter obtained by computer simulation.

FIG. 19 is a view showing an output transient response characteristics against load fluctuation obtained by computer simulation.

In response to the current change, the output voltage changes momentarily to follow the current change.

As can be known from FIG. 19, when load becomes small and therefore the current decreases from 1 A to 0.5 A, the voltage rises momentarily. However, in response to the voltage change, the ΔΣ modulator performs control so as to drop the voltage, and as a result, the voltage converges to the target voltage.

Conversely, when load becomes large and therefore the current decreases from 0.5 A to 1 A, the voltage drops momentarily. However, in response to the voltage change, the ΔΣ modulator performs control so as to raise the voltage, and as a result, the voltage converges to the target voltage.

In the process of the aforesaid control, overshoot will be caused due to the voltage fluctuation, and the smaller the overshoot, the better the power supply is deemed.

The overshoot can be reduced by reducing the time constant of the integrator of the ΔΣ modulator. However, there is a lower limit on the time constant. The overshoot can also be reduced by increasing the clock frequency so as to increase the resolution. However, due to the characteristic of the circuit elements, there is an upper limit on the clock frequency. Particularly, the clock frequency is determined depending on the frequency possible to perform switching control to both the first FET 111 and second FET 110 (which are switching elements).

When implementing the device, proper clock frequency and time constant of the integrator are determined by totally considering the load fluctuation, the overshoot range allowable by the load, the constant of the elements and the cost.

The following will be described with reference to FIG. 16.

The gain of the integrator configured by the operational amplifier 1602 can be adjusted by adjusting the resistor R1604.

The frequency characteristic of the integrator can be adjusted by adjusting the capacitor C1603.

Both the gain and the frequency characteristic of the integrator can be adjusted by adjusting the resistor R1606.

Balance can be achieved between following characteristic against the load fluctuation and power voltage stability by properly selecting the values of these elements.

The present embodiment includes the following applications.

(1) Although the first ΔΣ modulator 1507 and the second ΔΣ modulator 1508 are alternately driven respectively at the rising edges and falling edges of the clock source 1509 in the present embodiment, the first ΔΣ modulator 1507 and the second ΔΣ modulator 1508 can also be driven at rising edges only or at falling edges only. In such a case, in order to obtain a desired resolution, the modulators need to be driven using a clock having doubled frequency compared with the case where the modulators are alternately driven.

(2) The comparators 1607 and 1617 shown in FIG. 16 may simply be eliminated. In such a case, the function of the comparators can be performed by the terminal D of the D-FF 1605 and the terminal D of the D-FF 1615. Further, the reference voltage can be replaced by the threshold level of the terminals D.

(3) As can be known from FIG. 16, the step-down control and the step-up control both operate regardless of the level of the input voltage. Which means that even when the input voltage is high enough compared with the output voltage for example, the step-up control still operates slightly. Which leads to a thought that the voltage conversion efficiency can be improved by configuring the step-up/step-down control section 104 in such a manner that unnecessary step-up control or step-down control is not performed when the voltage difference between the input voltage and the output voltage is sufficiently large.

Figure 20:
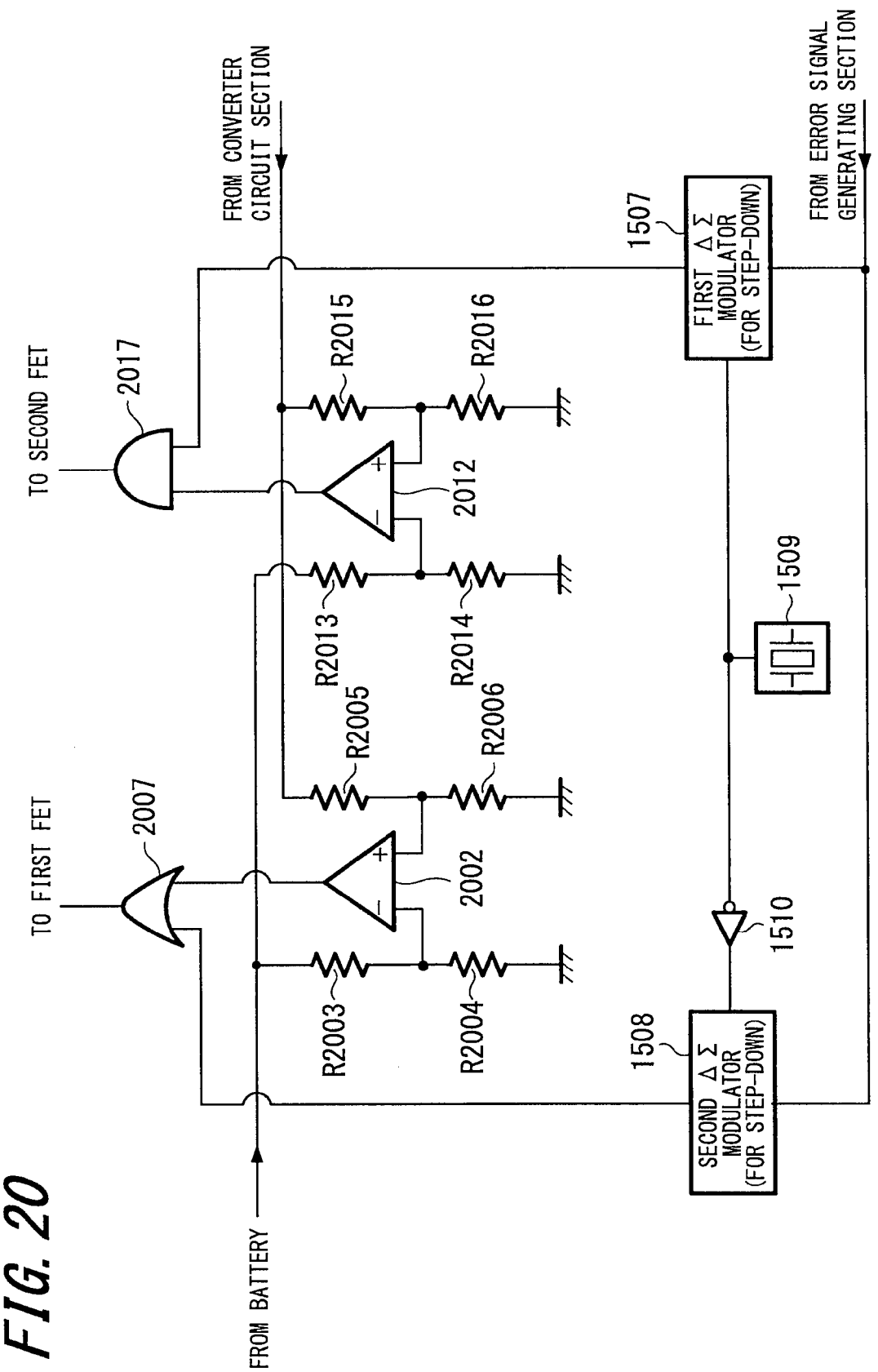
FIG. 20 is another circuit diagram of the DC/DC converter according to the second embodiment of the present invention.
Figure 21:
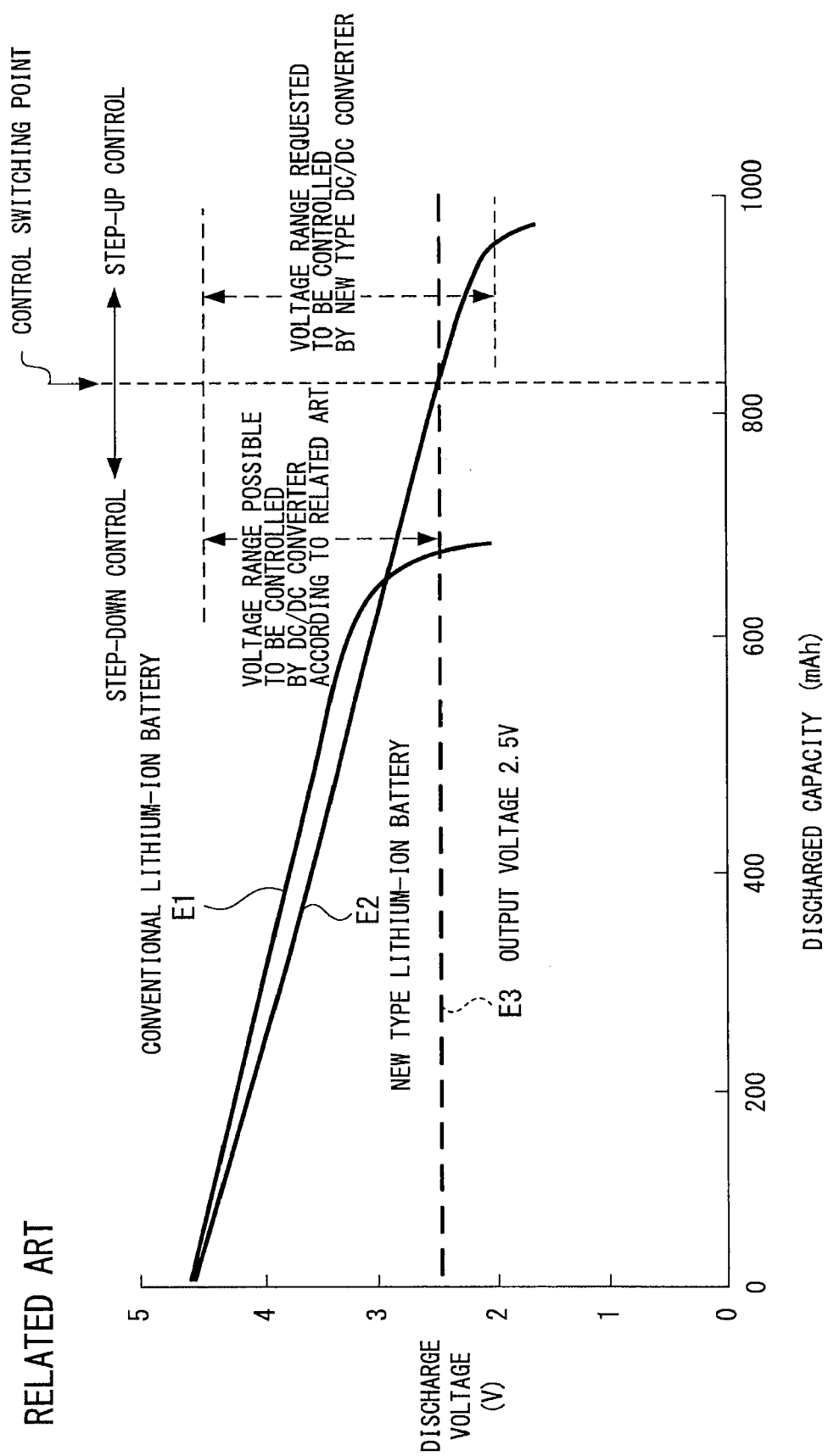
FIG. 21 is a graph showing the discharging characteristic of a new type battery.

FIG. 20 is a circuit diagram of the DC/DC converter according to the present embodiment. FIG. 20 shows an example in which a circuit is added to the control output of both the first ΔΣ modulator 1507 and the second ΔΣ modulator 1508 of the step-up/step-down control section 104.

A voltage obtained by dividing the voltage of the battery 105 with the resistors R2003 and R2004 is inputted to the negative side of a comparator 2002, and a voltage obtained by dividing the output voltage of the converter circuit section 102 with the resistors R2005 and R2006 is inputted to the positive side of the comparator 2002.

A voltage obtained by dividing the voltage of the battery 105 with the resistors R2013 and R2014 is inputted to the negative side of a comparator 2012, and a voltage obtained by dividing the output voltage of the converter circuit section 102 with the resistors R2015 and R2016 is inputted to the positive side of the comparator 2012.

The output of the comparator 2002 and the output of the second ΔΣ modulator 1508 are inputted to the OR gate 2007.

The output of the comparator 2012 and the output of the first ΔΣ modulator 1507 are inputted to the AND gate 2017.

The output of the OR gate 2007 is supplied to the gate terminal of the first FET 111 to perform step-down switching control.

The output of the AND gate 2017 is supplied to the gate terminal of the second FET 110 to perform step-up switching control.

The comparator 2002 outputs "H" when the voltage of the battery 105 is much lower than the output voltage of the converter circuit section 102. Thus, when the voltage of the battery 105 is so low that the step-down control is unnecessary, the comparator 2002 outputs "H", so that the OR gate 2007 outputs "H" regardless of the output of the second ΔΣ modulator 1508. Thus, the first FET 111 remains in "ON" state. In other words, the step-down control is not performed.

The comparator 2012 outputs "L" when the voltage of the battery 105 is much higher than the output voltage of the converter circuit section 102. Thus, when the voltage of the battery 105 is so high that the step-up control is unnecessary, the comparator 2012 outputs "L", so that the AND gate 2017 outputs "L" regardless of the output of the first ΔΣ modulator 1507. Thus, the second FET 110 remains in "OFF" state. In other words, the step-up control is not performed.

The present embodiment discloses a step-up/step-down DC/DC converter employing the ΔΣ modulators.

Compared to the PWM control according to conventional arts, the DC/DC converter according to the present embodiment has extremely simple circuit configuration. Further, with the DC/DC converter according to the present embodiment, fine adjustment to circuit constants is not necessary except for fine adjustment of resistance of the voltage-dividing resistors of the error signal generating section 103, and fine adjustments of the time constant of the integrator and clock frequency to reduce overshoot. Thus, it is possible to provide a DC/DC converter almost unnecessary to be adjusted, having stable performance and suitably to be used for mobile electronic equipment.

The embodiments of the present invention are described above, but it should be understand that the present invention is not limited to the above embodiments but includes various modifications and applications without departing from the spirit described in the claims of the present invention.

EXPLANATION OF REFERENCE NUMERALS

101 . . . DC/DC converter, 102 . . . converter circuit section, 103 . . . error signal generating section, 104 . . . step-up/step-down control section, 105 . . . battery, 106 . . . operational amplifier, 107 . . . step-down switching control section, 108 . . . step-up switching control section, 110 . . . second FET, 111 . . . first FET, 118 . . . internal resistance, 119 . . . voltage source, 202 . . . step-down PWM control section, 203 . . . step-up PWM control section, 204 . . . step-down PWM control switch, 205 . . . step-up PWM control switch, 206 . . . MIX controlling section, 615 . . . sawtooth wave oscillating circuit, 630, 643, 1407, 1607, 2002, 2012 . . . comparator, 631, 1402, 1602 . . . operational amplifier, 634 . . . monostable multivibrator, 635, 1410, 1510 . . . NOT gate, 636, 645, 2017 . . . AND gate, 644, 646, 2007 . . . OR gate, 637, 1405, 1605 . . . D-type flip-flop, 638 . . . Up/Down control section, 639 . . . A/D converter, 902, 903 . . . arrow, 904, 905, 906 . . . dotted line, 1130 . . . sample-and-hold circuit, 1135 . . . NOT gate, 1211 . . . first switch, 1212 . . . second switch, 1302 . . . A/D converter, 1303 . . . clock generator, 1304, 1305, 1312 . . . binary counter, 1306 . . . first offset value, 1307 . . . second offset value, 1308, 1309 . . . coincidence detector, 1310, 1311 . . . RS flip-flop, 1313 . . . preset value, 1409 . . . clock generator, 1421 . . . first ΔΣ modulating circuit, 1422 . . . second ΔΣ modulating circuit, 1507 . . . first ΔΣ modulator, 1508 . . . second ΔΣ modulator, 1509 . . . clock source, D112 . . . first diode, L113 . . . coil, D114 . . . second diode, C115, C127, C627, C640, C1403, C1603 . . . capacitor, R125, R126, R121, R122, R123, R124, R628, R629, R641, R642, R1404, R1406, R1604, R1606, R2003, R2004, R2005, R2006, R2013, R2014, R2015, R2016 . . . resistor

The invention claimed is:
1. A DC/DC converter comprising:
a step-down control switch for receiving an input voltage;
a first diode connected to the step-down control switch;
a coil connected to both the step-down control switch and the first diode;
a step-up control switch connected to the coil;
a second diode connected to both the coil and the step-up control switch;
a capacitor connected to the second diode;
an error signal generating section connected to the capacitor to output an error signal, which represents the difference between the voltage across the terminals of the capacitor and a target voltage;
a step-down PWM control section for generating a PWM control signal and controlling the step-down control switch upon receiving the error signal;
a step-up PWM control section for generating a PWM control signal and controlling the step-up control switch upon receiving the error signal;
a step-down PWM control switch connected between the step-down PWM control section and the step-down control switch;
a step-up PWM control switch connected between the step-up PWM control section and the step-up control switch; and
a MIX controlling section connected to both the step-down PWM control switch and the step-up PWM control switch and adapted to exclusively control the step-down control switch with the step-down PWM control section and control the step-up control switch with the step-up PWM control section by alternately switching between the step-down PWM control switch and the step-up PWM control switch in a state where the step-down PWM control section generates a step-down PWM control signal duty ratio at which voltage step-down effect of the step-down PWM control performed by the step-down control switch becomes the minimum and where the step-up PWM control section generates a step-up PWM control signal duty ratio at which voltage step-up effect of the step-up PWM control performed by the step-up control switch becomes the minimum.

2. The DC/DC converter according to claim 1, wherein the MIX controlling section performs operation control upon detecting that the input voltage falls within a predetermined range.

3. The DC/DC converter according to claim 1, wherein the MIX controlling section performs operation control upon detecting that voltage difference between the input voltage and the voltage across the terminals of the capacitor falls within a predetermined range.

4. The DC/DC converter according to claim 1,
wherein the step-down PWM control section comprises a sample-and-hold circuit for holding the error signal, and
wherein the MIX controlling section detects that the input voltage is lower than a predetermined voltage, and drives and controls the sample-and-hold circuit.

* * * * *

UNITED STATES PATENT AND TRADEMARK OFFICE
CERTIFICATE OF CORRECTION

PATENT NO. : 8,164,316 B2
APPLICATION NO. : 12/306612
DATED : April 24, 2012
INVENTOR(S) : Yasunori Kobori et al.

It is certified that error appears in the above-identified patent and that said Letters Patent is hereby corrected as shown below:

On the title page Item (86), the PCT information is incorrect. Item (86) should read:

--(86) PCT No.: PCT/JP2007/061737

§ 371 (c)(1),
(2), (4) Date: April 09, 2009--

Signed and Sealed this
Nineteenth Day of June, 2012

David J. Kappos
*Director of the United States Patent and Trademark Office*